Aug. 3, 1948.                     C. G. TURNER                        2,446,201
                 APPARATUS FOR WORKING, CONVEYING, AND CUTTING DOUGH
Filed Oct. 25, 1941                                        19 Sheets-Sheet 1
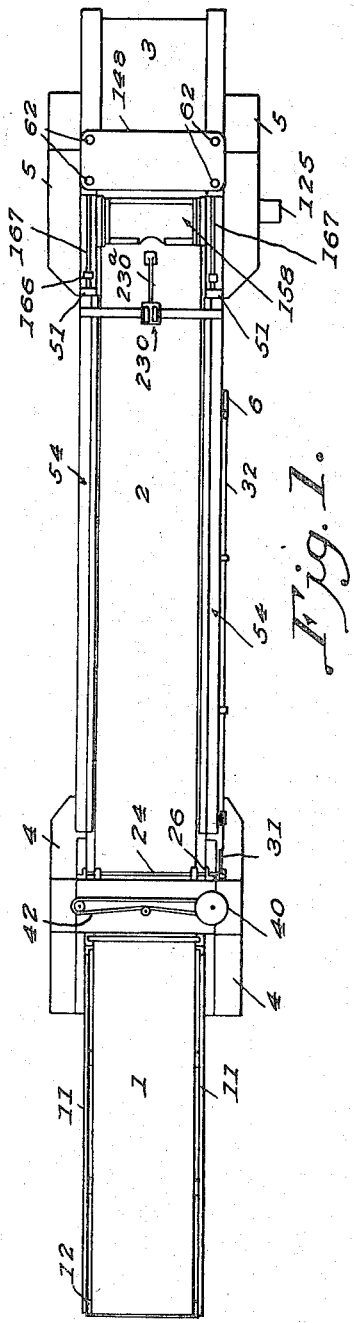
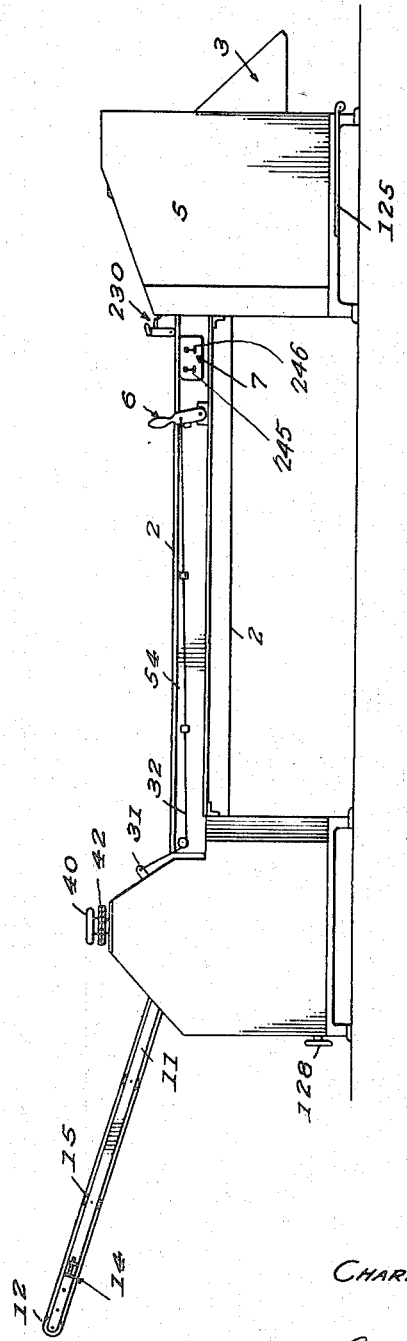
Inventor
CHARLES G. TURNER
By Dudley Cole Sauer
Attorneys Aug. 3, 1948.    C. G. TURNER    2,446,201
APPARATUS FOR WORKING, CONVEYING, AND CUTTING DOUGH
Filed Oct. 25, 1941    19 Sheets-Sheet 2

Inventor
CHARLES G. TURNER
By
Attorneys

Aug. 3, 1948.                    C. G. TURNER                    2,446,201
            APPARATUS FOR WORKING, CONVEYING, AND CUTTING DOUGH
Filed Oct. 25, 1941                                    19 Sheets-Sheet 4

Inventor
CHARLES G. TURNER

Attorneys

Aug. 3, 1948.  C. G. TURNER  2,446,201
APPARATUS FOR WORKING, CONVEYING, AND CUTTING DOUGH
Filed Oct. 25, 1941   19 Sheets-Sheet 5

Inventor
CHARLES G. TURNER
Attorneys

Aug. 3, 1948. C. G. TURNER 2,446,201
APPARATUS FOR WORKING, CONVEYING, AND CUTTING DOUGH
Filed Oct. 25, 1941 19 Sheets-Sheet 6

Inventor
CHARLES G. TURNER

Aug. 3, 1948. C. G. TURNER 2,446,201
APPARATUS FOR WORKING, CONVEYING, AND CUTTING DOUGH
Filed Oct. 25, 1941 19 Sheets-Sheet 8

Inventor
CHARLES G. TURNER
By Dusey Cole & Sauer
Attorneys

Aug. 3, 1948.            C. G. TURNER            2,446,201
APPARATUS FOR WORKING, CONVEYING, AND CUTTING DOUGH
Filed Oct. 25, 1941                          19 Sheets-Sheet 9

Inventor
CHARLES G. TURNER

By Dreey Cole & Warner
Attorneys

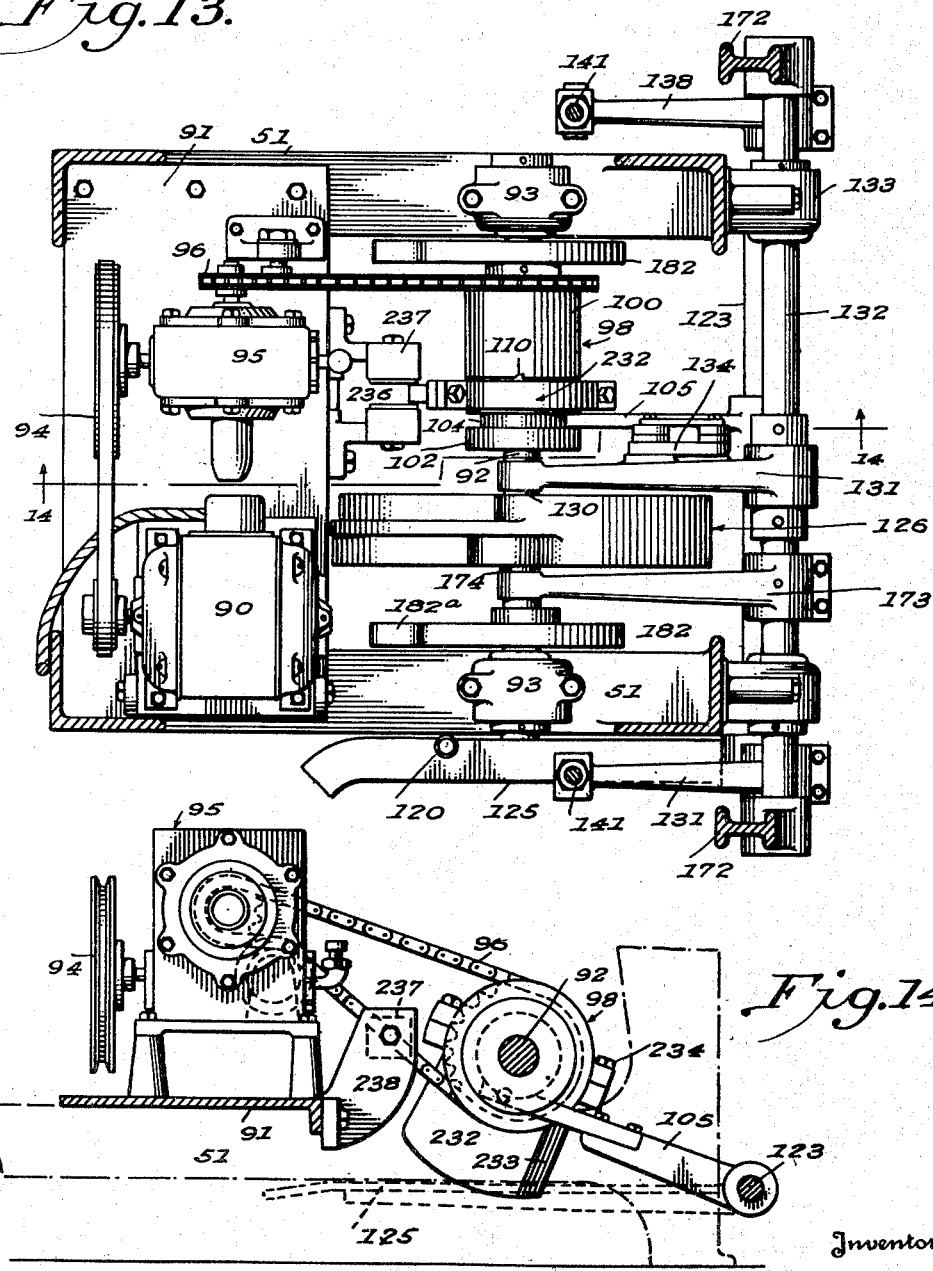

Aug. 3, 1948.  C. G. TURNER  2,446,201
APPARATUS FOR WORKING, CONVEYING, AND CUTTING DOUGH
Filed Oct. 25, 1941  19 Sheets-Sheet 11

Inventor
CHARLES G. TURNER
By Dusey Cole Garner
Attorneys

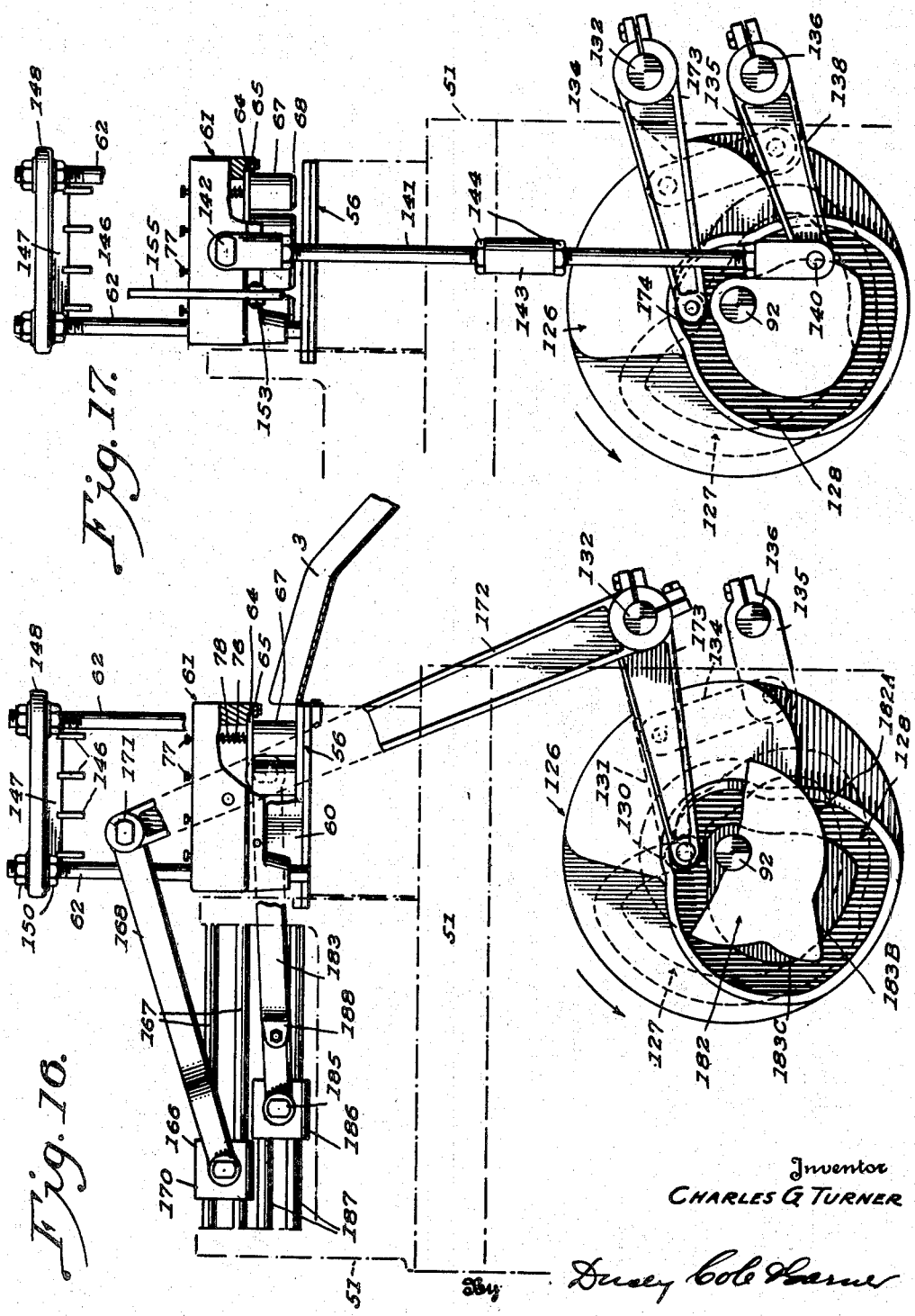

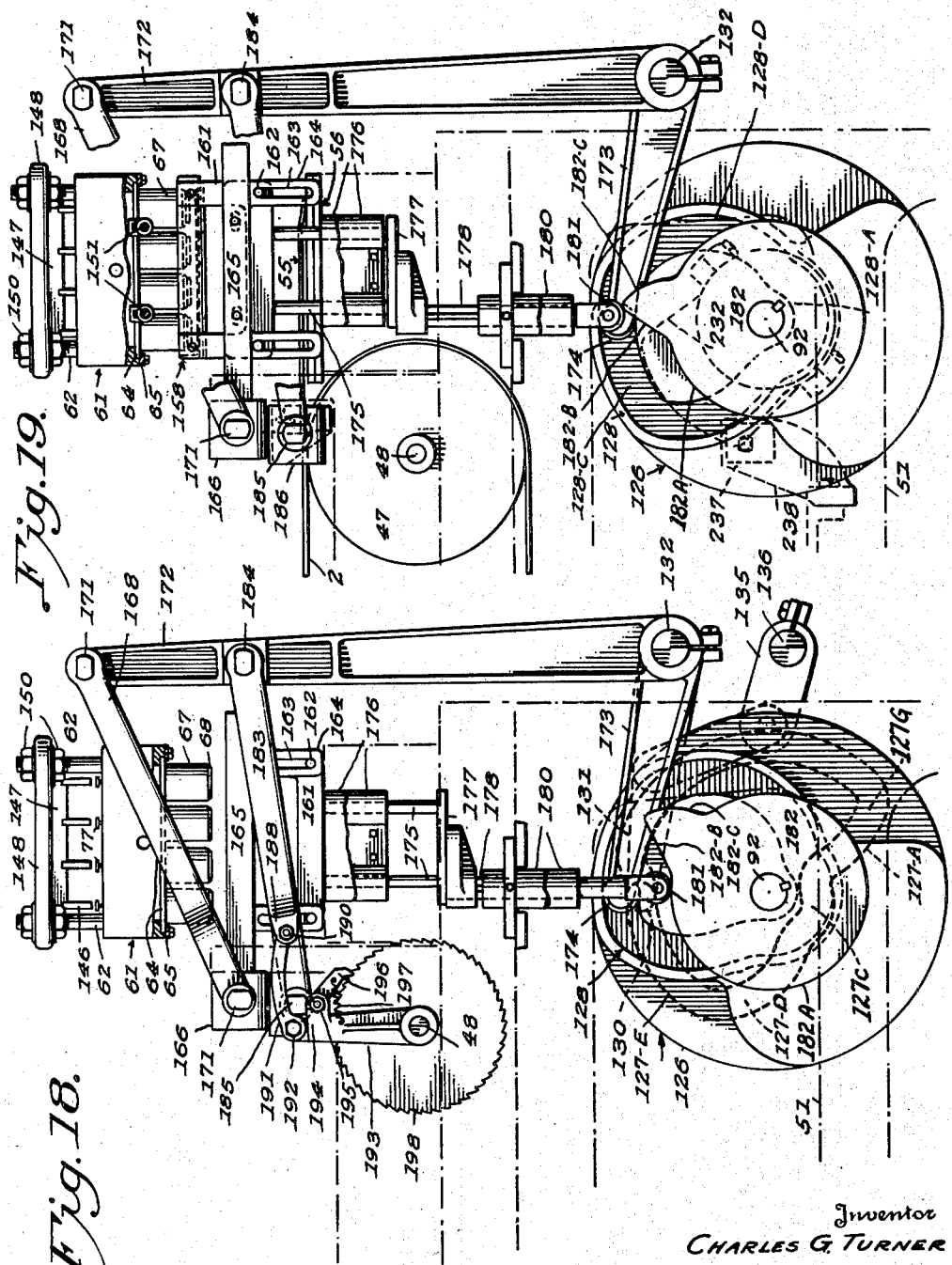

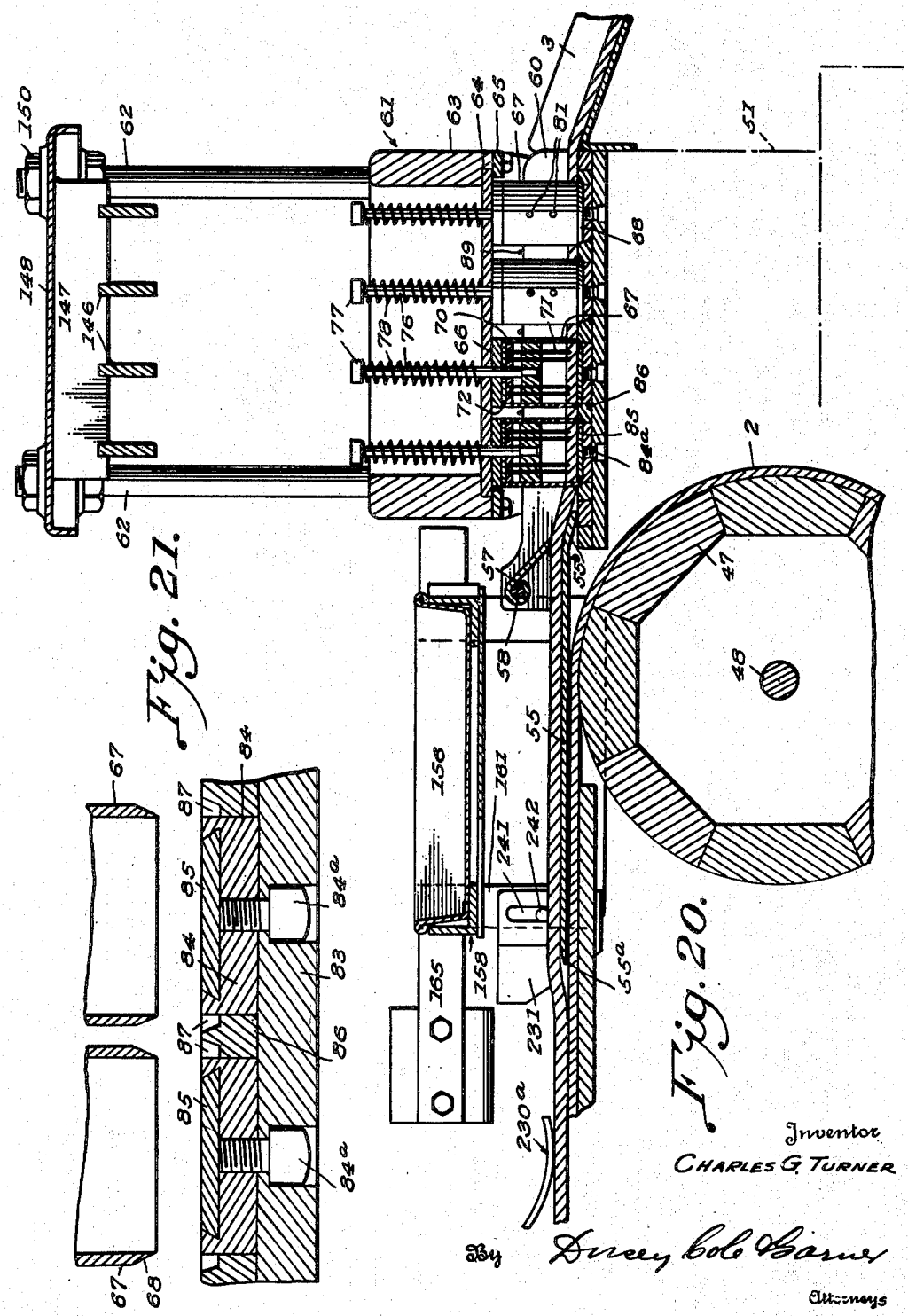

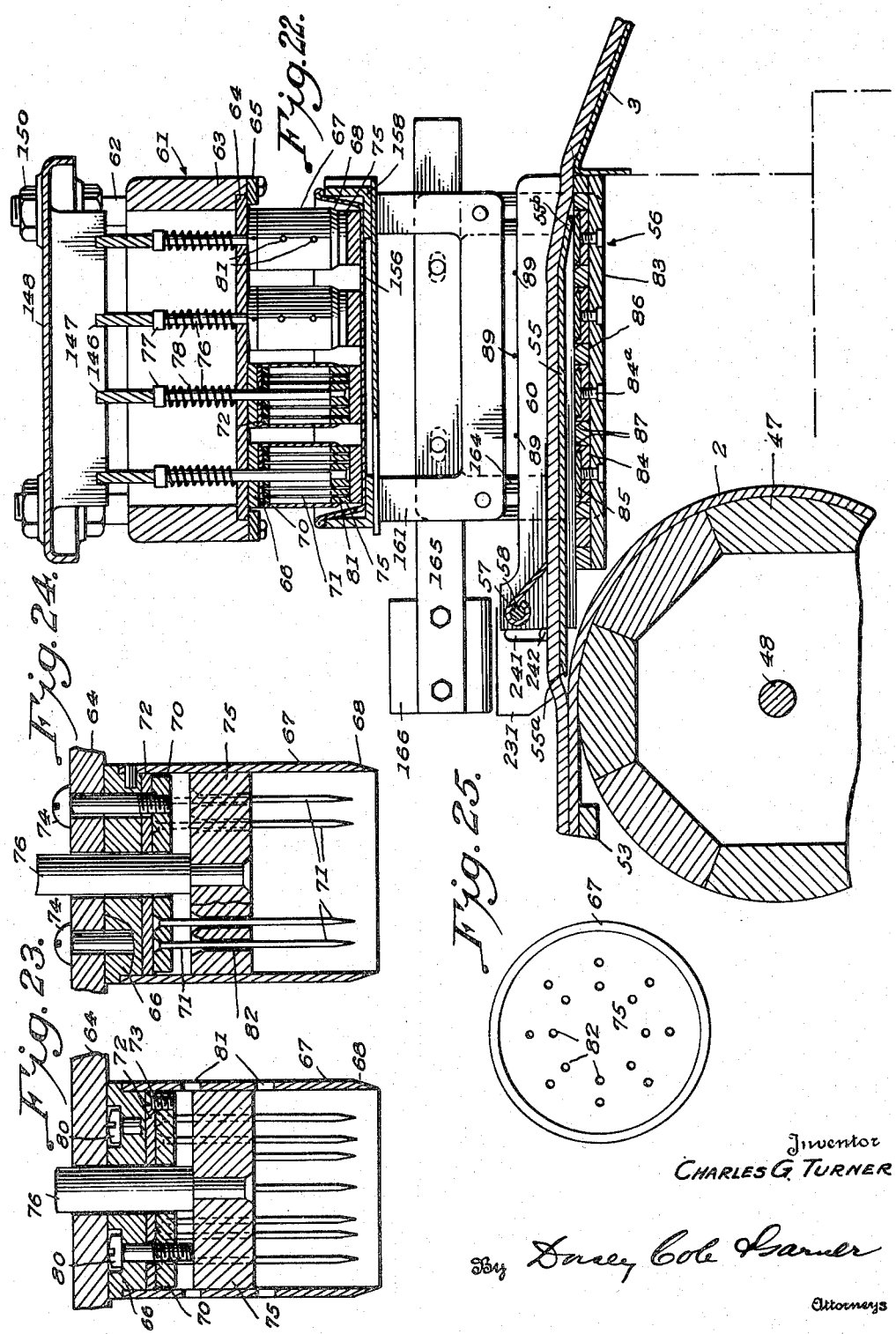

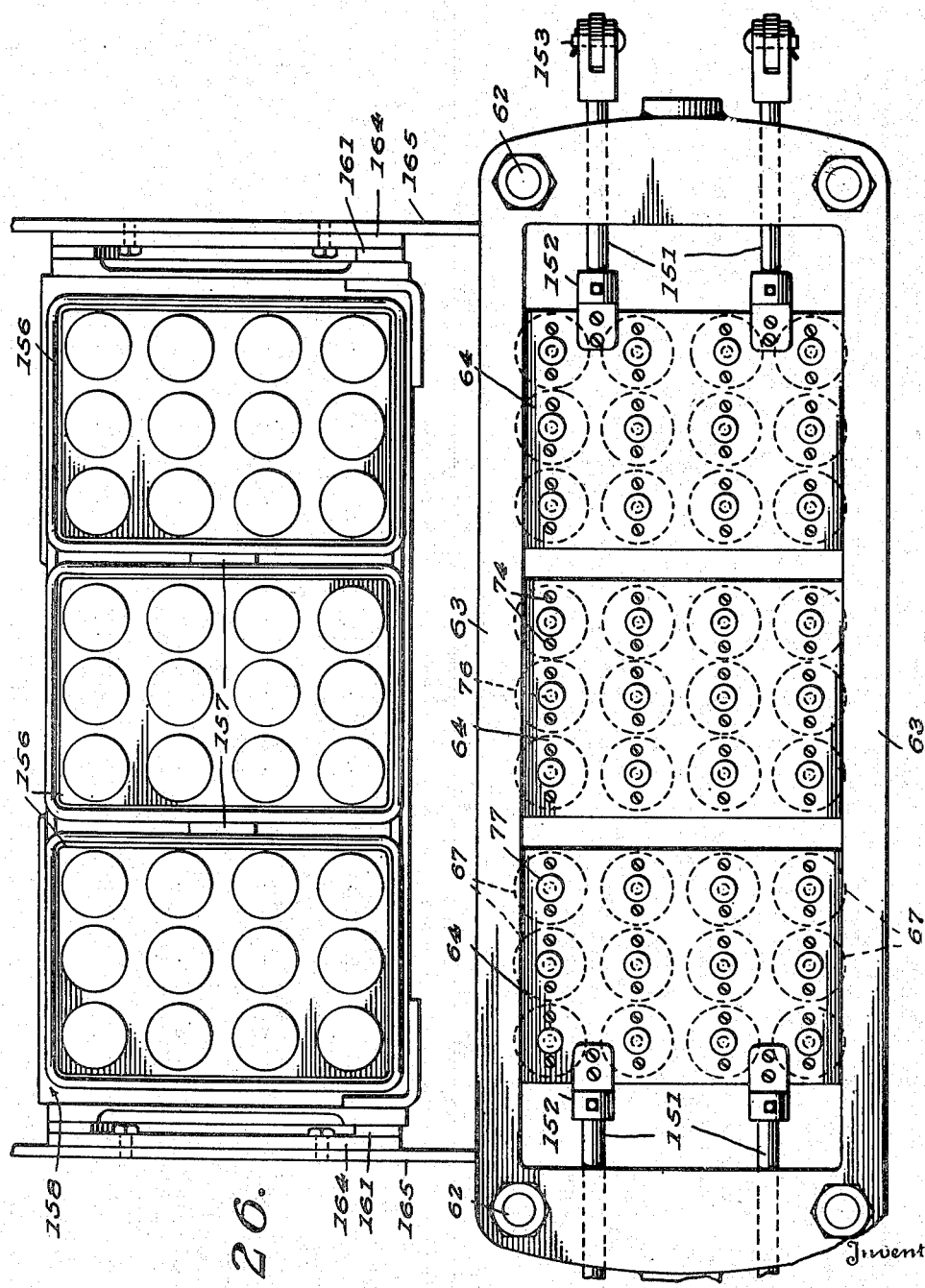

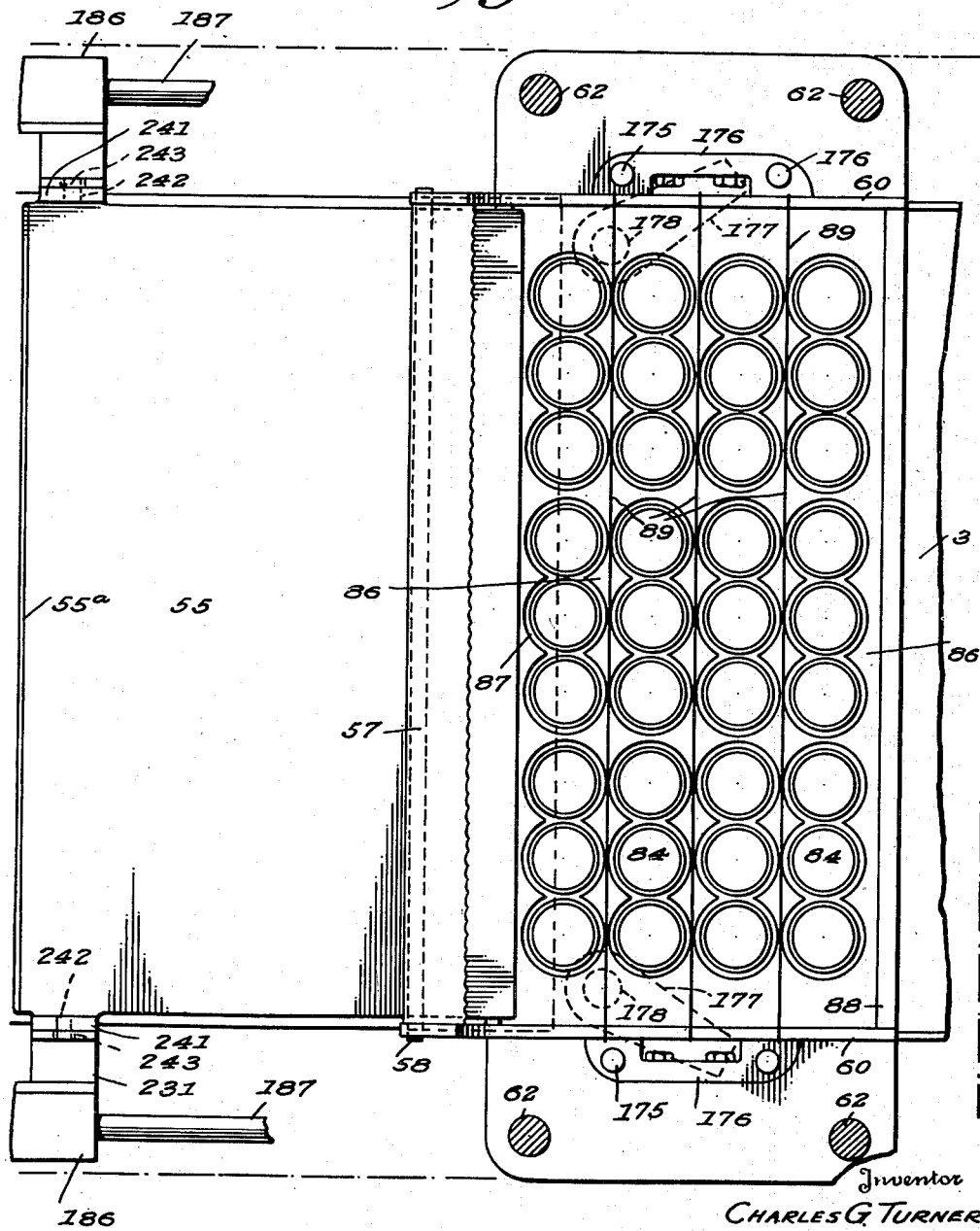

Aug. 3, 1948.   C. G. TURNER   2,446,201
APPARATUS FOR WORKING, CONVEYING, AND CUTTING DOUGH
Filed Oct. 25, 1941   19 Sheets-Sheet 18
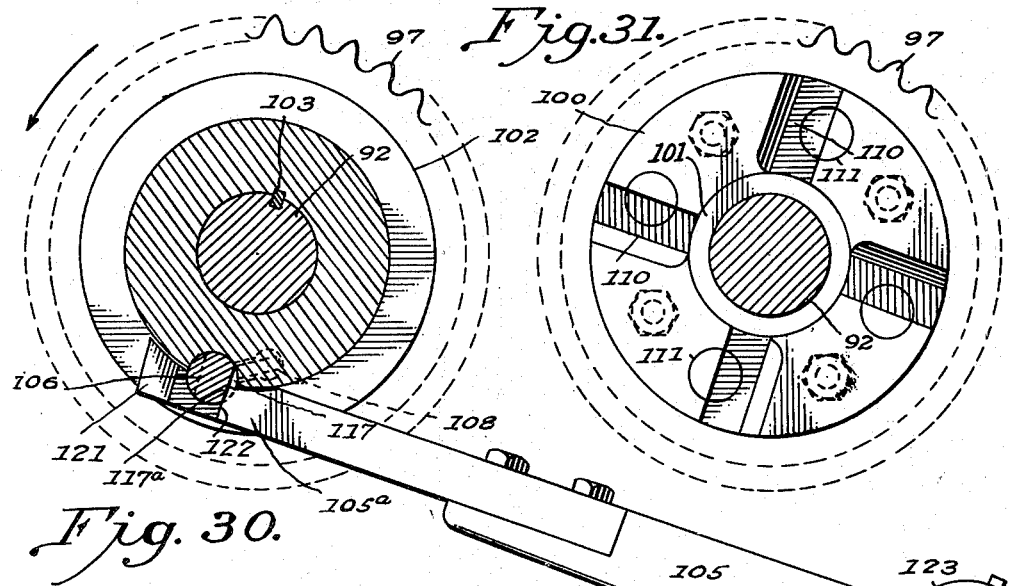
Inventor
CHARLES G. TURNER
By Dulsey Cole & Garner
Attorneys Aug. 3, 1948.  C. G. TURNER  2,446,201
APPARATUS FOR WORKING, CONVEYING, AND CUTTING DOUGH
Filed Oct. 25, 1941  19 Sheets-Sheet 19
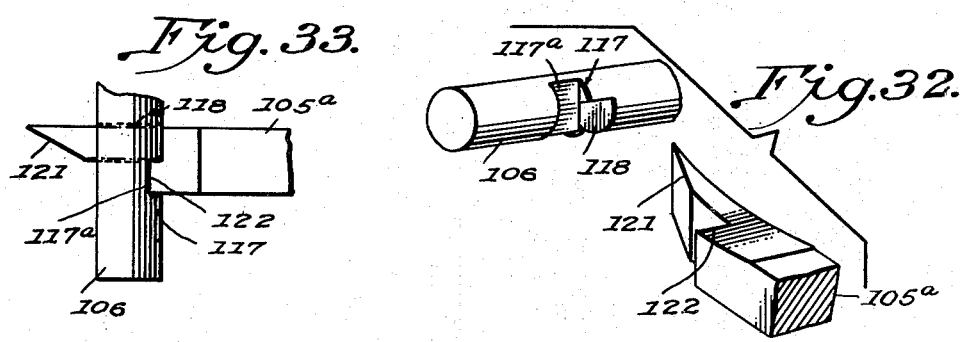
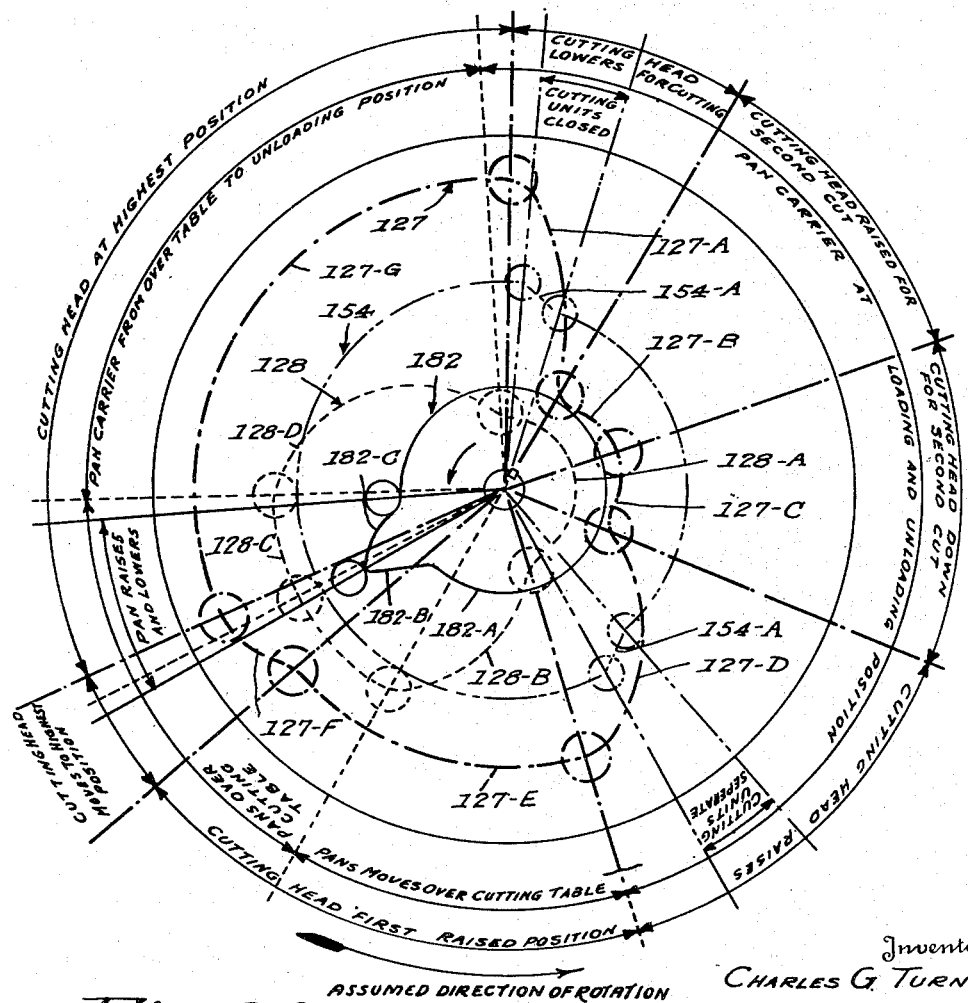
Inventor
CHARLES G. TURNER Patented Aug. 3, 1948

2,446,201

UNITED STATES PATENT OFFICE 2,446,201

APPARATUS FOR WORKING, CONVEYING, AND CUTTING DOUGH

Charles Gainer Turner, Atlanta, Ga., assignor to Turner Manufacturing Company, Incorporated, a corporation of Georgia Application October 25, 1941, Serial No. 416,573

29 Claims. (Cl. 107—6)

The present invention relates to a method of and apparatus for working a mass of dough into a sheet of substantially uniform thickness and cutting a plurality of biscuits simultaneously from the sheet of dough in such a way that a minimum of scrap dough remains after the cutting operation. The invention also comprehends a delivery of the individually cut biscuits simultaneously to baking pans which are later transported to the baking oven.

A primary object of the invention is to preliminarily work the dough into proper sheet form, and thereafter cut and pan the biscuits with a minimum of manual labor, thus materially increasing the commercial production of biscuits over known methods and consequently lowering their cost to the ultimate consumer.

The invention is especially adapted for the manufacture of butter biscuits which are formed from two or more layers of yeast dough between which is interposed a film of butter or oleaginous material, and the invention will be described in connection with the manufacture of biscuits from a dough sheet of this type. The invention, however, is adaptable also for the manufacture of biscuits from a single sheet or layer of dough.

The invention contemplates the breaking or rolling of a mass of dough into sheet form after which the sheet is spread upon a work table and one-half of the upper surface of the sheet is coated with a film of butter or other oleaginous material. The dry portion of the sheet is then folded over the buttered half of the sheet, and the dough sheet thus constituted is thereafter delivered to a conveyor and moved rearwardly toward the dough-working or rolling mechanism. The foregoing steps are performed manually by a skilled attendant.

From this point on, the several steps to which the dough is subjected is performed mechanically by the machine under the control of an operator who takes a position adjacent the biscuit-cutting mechanism. As the sheet approaches the working or rolling mechanism, it is caused to travel in a substantially horizontal direction between forming rolls which roll the dough to the desired thickness, after which it moves horizontally and in flat form to an intermediate conveyor. This conveyor, through associated mechanism, delivers a required portion of the dough sheet to the biscuit-cutting mechanism, which cuts simultaneously a plurality of individual biscuits from the dough sheet. Following the cutting of the biscuits, they are deposited in baking pans to be delivered later to the baking oven. Following the cutting of the biscuits, an uncut portion of the dough sheet is advanced to a position over the cutting table for the next succeeding biscuit-cutting operation. Inasmuch as yeast dough has a substantial tendency to contract, provision is made to prevent this as the dough moves to and rests upon the cutting table. Provision is also made for the removal of scrap dough from the cutting point.

From the standpoint of hygiene, the dough is not touched by the hands following the delivery of the dough sheet to the proximity of the working or rolling mechanism, since all of the steps, including the working or rolling, conveying, cutting, and delivering to the pans, are occasioned by mechanical instrumentalities.

The above and additional features of the invention will be hereinafter more fully described with reference to the accompanying drawings, it being understood that changes may be made without departing from the spirit of the invention.

Referring now to the drawings in which corresponding parts are identified by corresponding marks of reference:

Figure 1 is a plan view of the apparatus illustrating in a general way the layout of the dough-receiving and working or rolling mechanism, the rolled dough or intermediate conveyor, the biscuit-cutting and panning mechanism, and the discharge chute for the scrap dough.

Figure 2 is a side elevation of Figure 1.

Figure 12 is a plan view of the mechanism shown in Figures 10 and 11.

Figure 13 is a plan view illustrating the motor drive for producing the travel of the intermediate conveyor in conjunction with the actuation of the biscuit-cutting and panning mechanism.

Figure 14 is a detailed view illustrating in part the braking mechanism for the main drive shaft of the biscuit-cutting and panning mechanism taken approximately on the line 14—14 of Figure 13.

Figure 10:
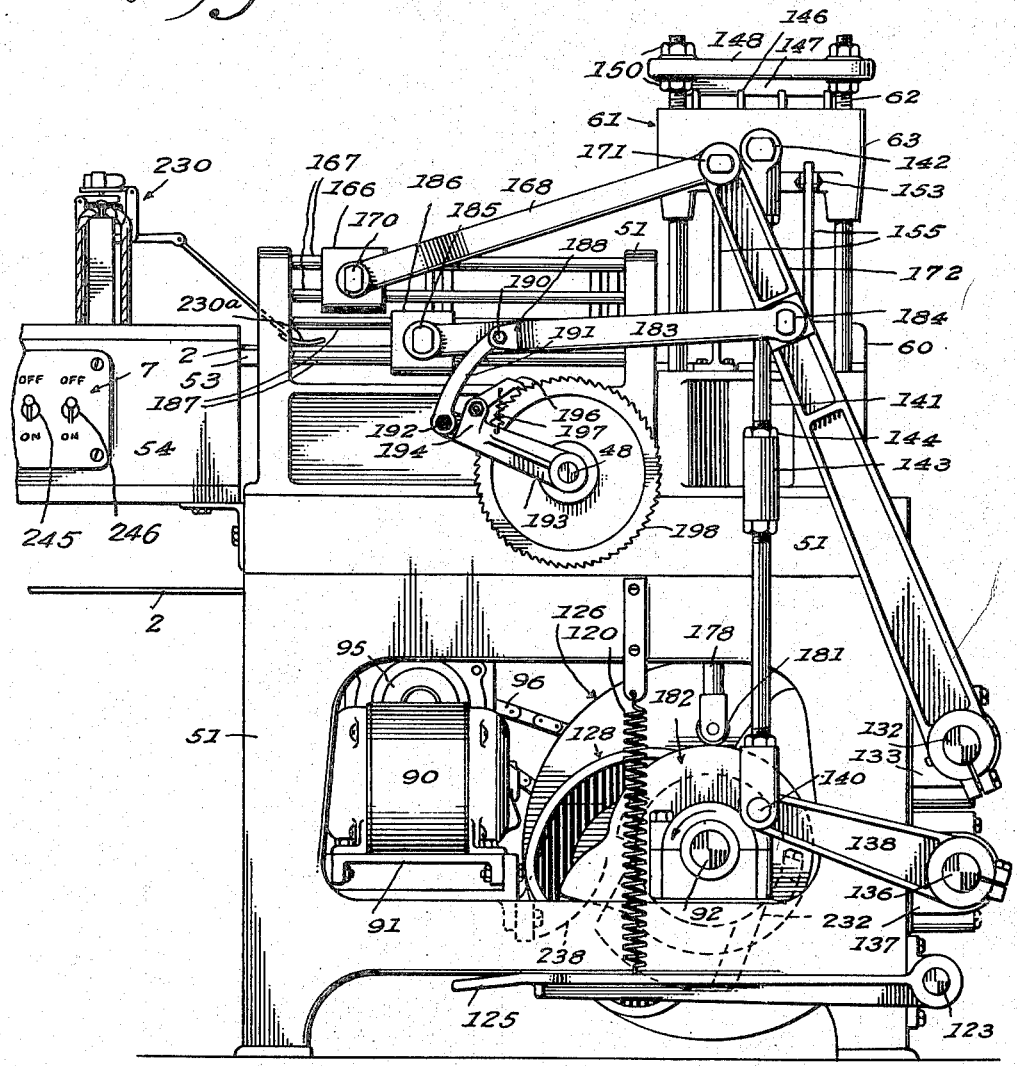
Figure 10 is a side elevation of the biscuit-cutting and panning mechanism and various actuating parts occupying a normal position of rest.
Figure 15:
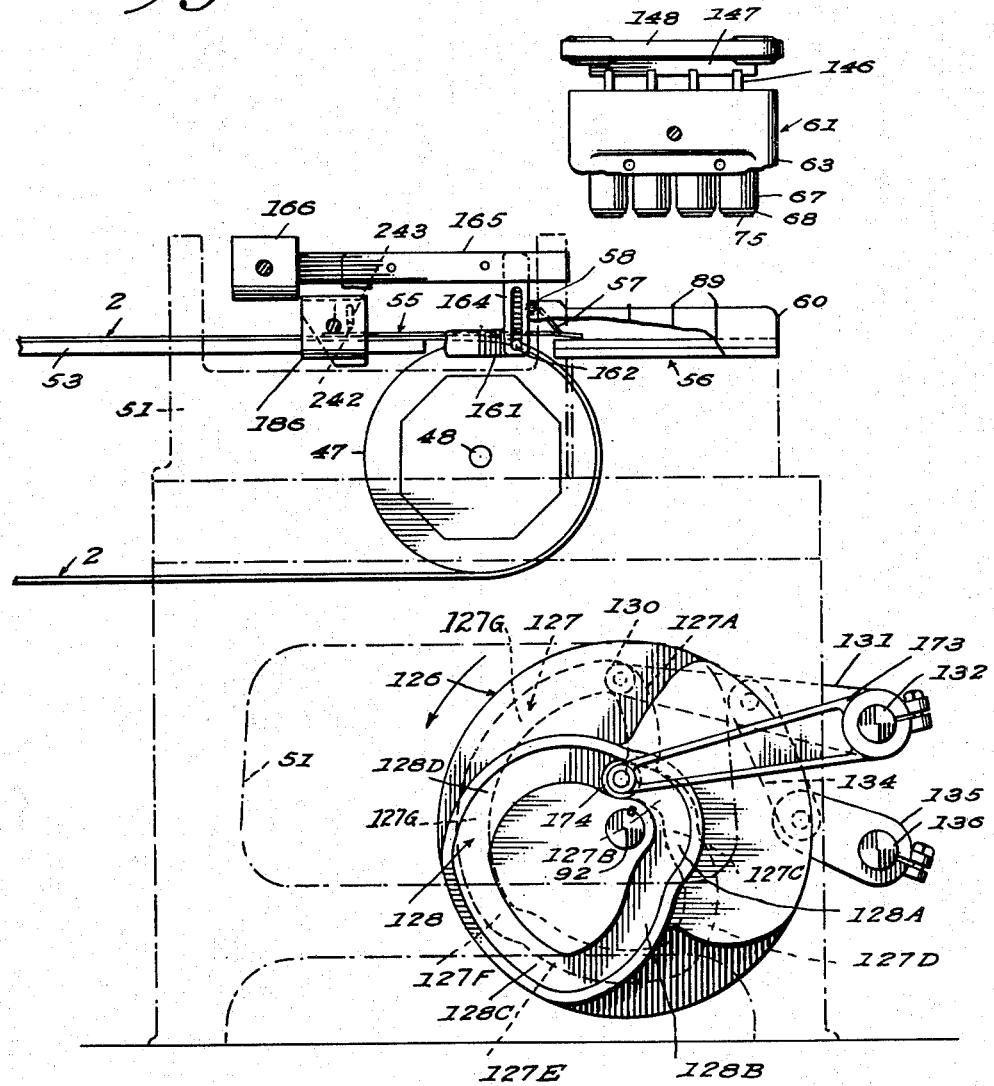

Figure 15 is a diagrammatic side elevation based on the position of certain of the parts which they would occupy if visible in Figure 10, and of the cams fast to the main drive shaft for the biscuit-cutting and panning mechanism, the pan-carrier being in position to receive or permit the removal of the pans, and the biscuit-cutting mechanism in elevated or uppermost position. The position of the parts here illustrated represent a short period of rest in the operation of the machine.

Figure 16 is a side view showing the biscuit-cutting head in its lowermost or cutting position, and the actuating mechanism for moving the pan-carrier to and from the position beneath the biscuit-cutting head.

Figure 17 is a side view showing the cam in dotted lines and actuating mechanism for raising and lowering the biscuit-cutting head and also showing the cam for moving the pan-carrier horizontal, and the dough-advancing plate.

Figure 18 is a view showing the pan-carrier beneath the biscuit-cutting head, the actuating mechanism therefor, and the mechanism for producing the travel of the intermediate conveyor to transport the dough to a position beneath the biscuit-cutting head.

Figure 19 is a view illustrating the biscuit-cutting head in uppermost position and the biscuit-receiving pans in elevated position.

Figure 20 is a sectional view illustrating the details of the biscuit-cutting head and the pan-carrier, showing a pan positioned therein.

Figure 21 is a fragmentary detail view of the cutting table upon which the biscuits are cut.

Figure 22 is a sectional detail view of the cutter head and pan-carrying mechanism, illustrating the position of these parts when the cut biscuits are ejected from the individual cutters into the pan.

Figures 23 and 24 are enlarged sectional views taken at right angles to one another, illustrating an individual biscuit-cutter.

Figure 25 is a bottom plan view of an individual cutter.

Figure 26 is a plan view of the pan-carrier and the biscuit-cutting head.

Figure 27 is a plan view of the cutting table upon which the dough rests for the cutting operation.

Figure 28 is a longitudinal section through the clutch on the main drive shaft, the clutch elements being shown in disengaged position.

Figure 29 is a plan view, parts being broken away to illustrate the mounting of the clutch pin.

Figure 30 is a cross section on the line 30—30 of Fig. 28.

Figure 31 is a cross section on the line 31—31 of Fig. 28, showing the several recesses for the clutch pin.

Figure 32 is a perspective view of the clutch pin showing the recesses or slots therein.

Figure 33 is a plan view of the clutch pin and a part of the arm for operating the same.

Figure 34 is a cam development chart illustrating the relative sequence of the several cams for moving the dough sheet onto the cutting table, and actuating the cutting head and pan-carrier.

Figures 1 and 2 show the general assembly of the machine in plan and side elevation, respectively. In these figures there is shown the dough-receiving and conveying belt 1, the return flight of the intermediate conveyor 2, and the discharge chute 3 for the scrap dough. The dough rolls and their actuating mechanism are enclosed by the safety casing 4. Similarly, there is a safety casing 5 for the dough-cutting and panning mechanism. The operator of the machine normally works in the vicinity of the hand lever 6 and foot treadle 125 hereinafter described. The details of the machine will be described mainly in the order in which the dough passes therethrough.

*The supporting frames.*—The dough-receiving conveyor, the dough-advancing mechanism, the dough rolls and front end of the intermediate conveyor are supported on the front frame 10. The biscuit-cutting table, the biscuit-cutting head, the panning mechanism, the discharge chute for the scrap dough, and the rear end of the intermediate conveyor are supported on the rear frame 51. The frames 10 and 51 are connected together and held in alignment by the horizontal rails 54 (see Figs. 1, 2 and 5). The rails 54 also serve to support the upper run of the intermediate conveyor 2 and the electric switch 230.

Figure 6:
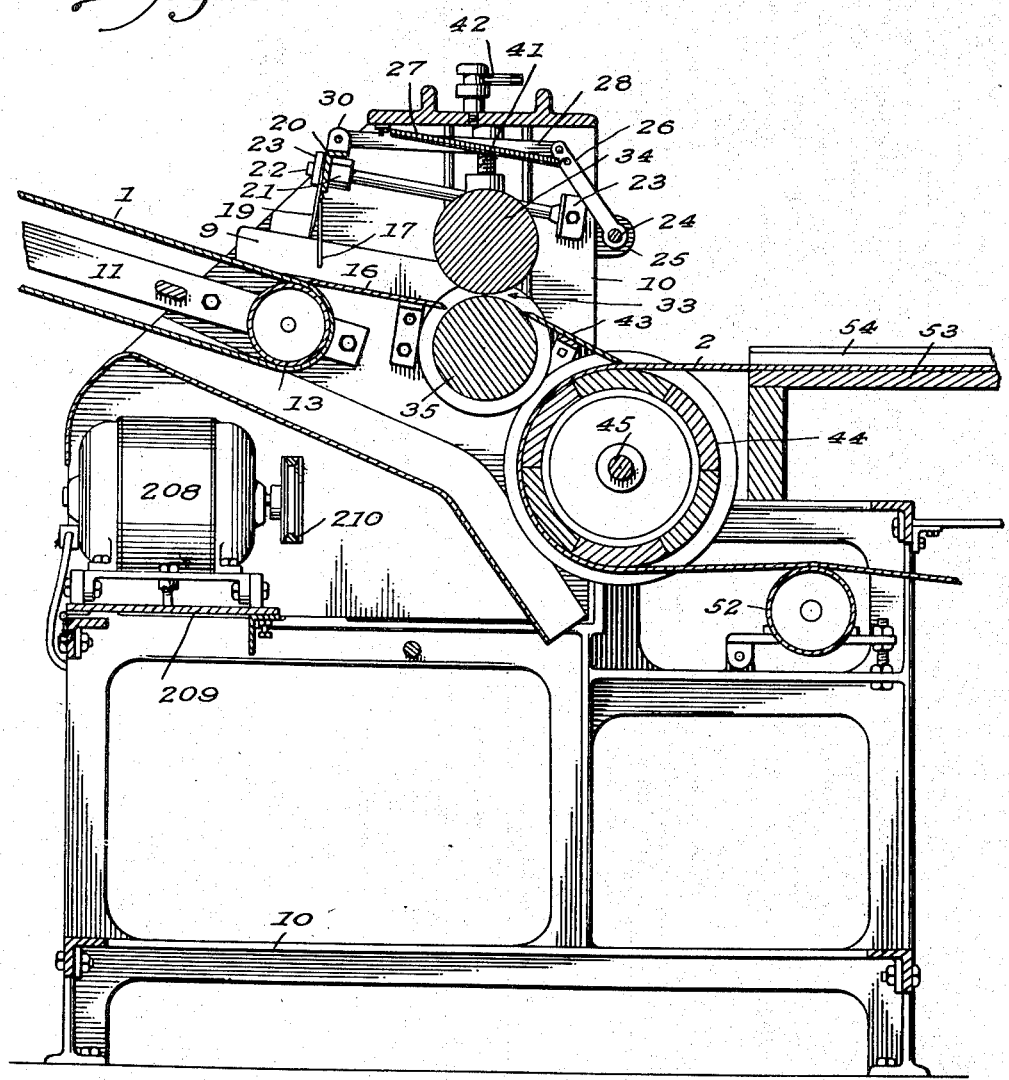
Figure 6 is a longitudinal section taken on the line 6—6 of Figure 3.

*The dough-receiving conveyor and dough-working or rolling mechanism.*—As shown in Figure 6, the frame 10 supports the dough-receiving conveyor and the dough-working or rolling mechanism. Attached to each side of the frame 10 and projecting forwardly and upwardly therefrom at a slight incline, are the bars 11 which carry at their outer ends the rolls 12. Another roll 13 is suitably carried in the bars 11. The dough-receiving and conveying belt 1 passes over these rolls and may be tightened when desired by the usual belt-tightener 14. Intermediate rolls 15 idling between the belt flights, serve to support the conveying surface of the belt.

Figure 8:
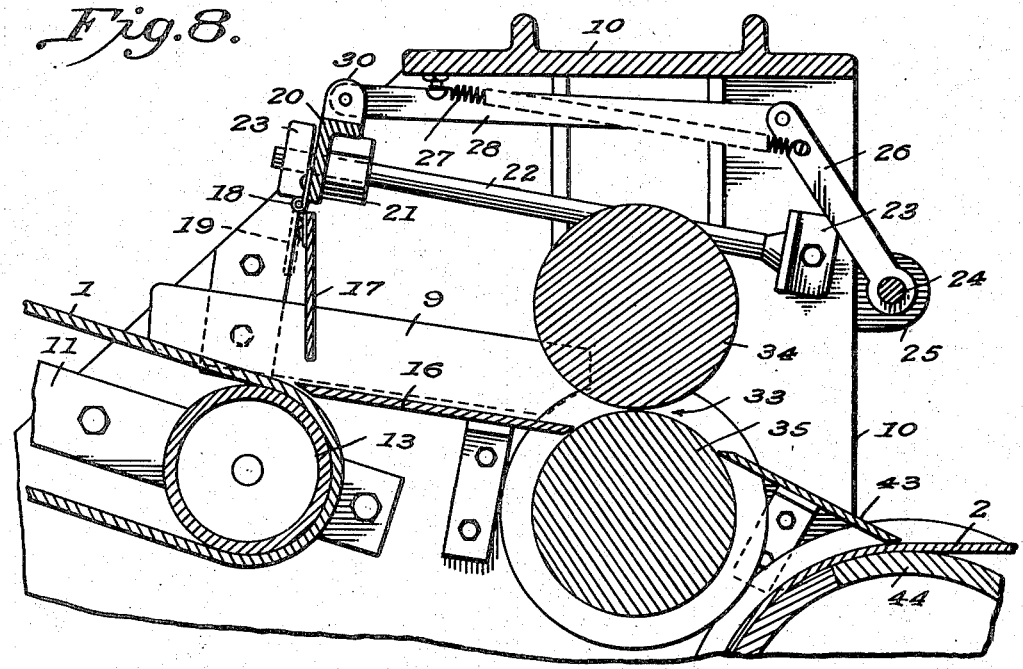
Figure 8 is an enlarged section view of the rear end of the dough-receiving conveyor, the dough-advancing mechanism, and the dough working or rolling mechanism.
Figure 9:
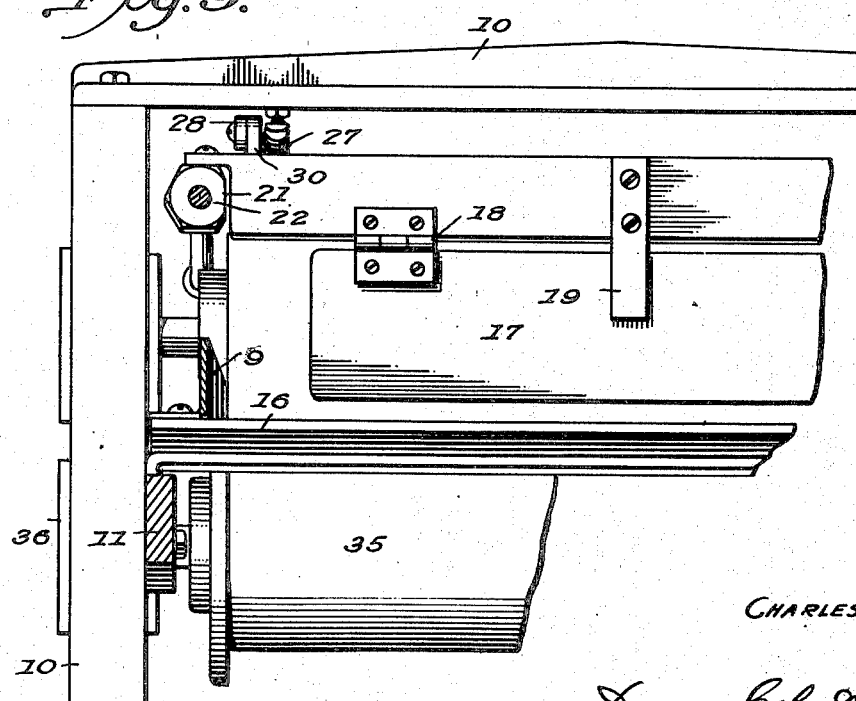
Figure 9 is a fragmentary view taken at right angles to Figure 8.

The belt 1, with a mass of dough thereon is moved by an attendant in a rearward or feeding direction which causes the dough to pass over the bridge 16 and beneath a plate 17, pivoted at 18 to a cross bar 20. The plate 17 is free to swing rearwardly in the direction of the dough rolls but its forward movement is restrained by the stop 19 affixed to the cross bar 20, as shown in Figs. 8 and 9. The dough sheet is guided and restrained against lateral movement in its travel from the conveyor 1 and across the bridge 16 by the vertical guides 9 fastened to opposite sides of the frame 10. The cross bar 20 has its ends attached to the blocks 21 bored to slide on horizontal rods 22 supported by brackets 23 on opposite sides of the frame 10.

A shaft 24 extends transversely of the machine and is supported by brackets 25 attached to the frame 10 (see Figs. 5, 6, 7 and 8). Fast to the shaft 24 near the opposite ends thereof, are arms 26 normally held in the position shown in Figure 8 by the retractile springs 27. The outer ends of the arms 26 are pivoted to one end of links 28 and the opposite ends of the links are pivotally connected to ears 30 carried by the cross bar 20. An arm 31 is fast to the transverse shaft 24, and its outer end is connected to one end of a cable 32 which leads to and is connected to the hand lever 6. A movement of this lever toward the rear of the machine (to the right in Figs. 1 and 2), by the operator causes the plate 17 to be slightly embedded in the dough sheet and pull the sheet across the bridge 16 and feed the advancing edge of the sheet to the pass between the dough rolls. When the hand lever 6 is released the springs 27 return it and the plate 17 to their original position.

Figure 7:
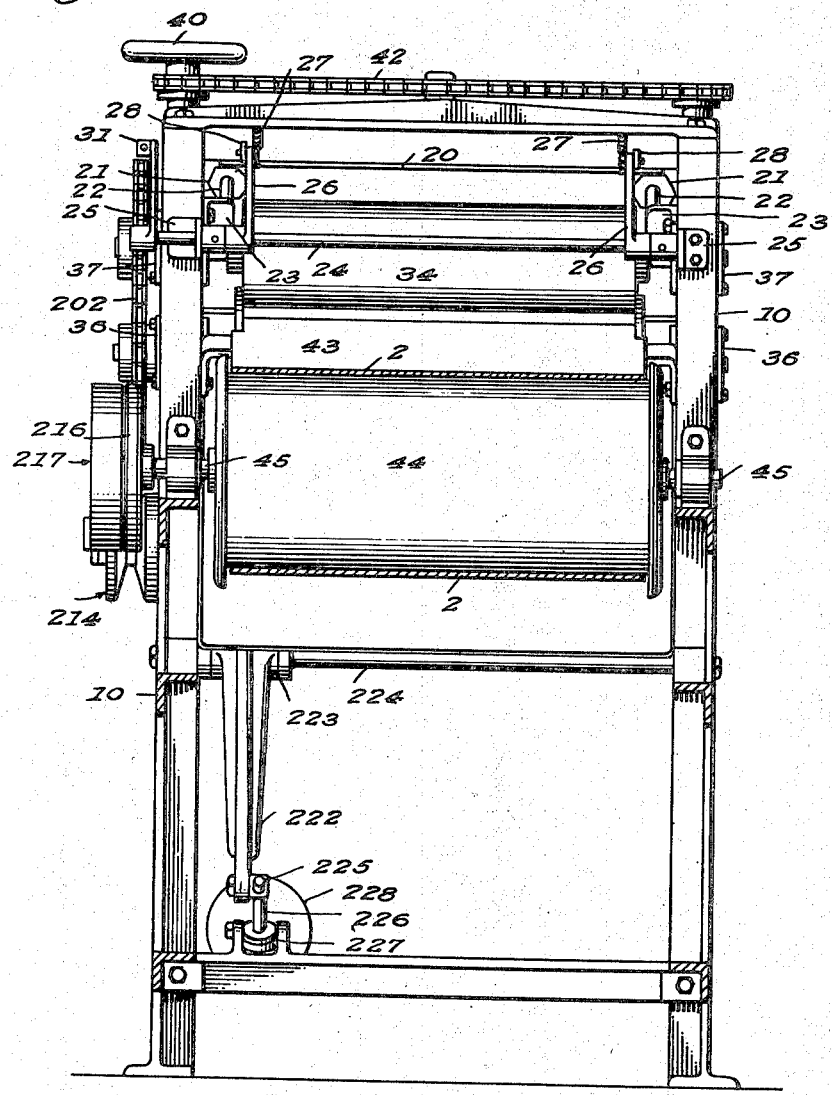
Figure 7 is a transverse section on the line 7—7 of Figure 5.

The dough sheet crosses the plate 16 and enters a rolling or forming pass 33 between the dough rolls 34 and 35. The lower roll 35 is provided with a shaft 35ª mounted in bearing blocks 36 located in opposite sides of the frame 10. The upper roll 34 is provided with a shaft 34ª mounted in adjustable bearing blocks 37 carried in slides 38 on opposite sides of the frame 10. The bearing blocks 37 may be adjusted so as to raise or lower the upper roll, and thus determine the thickness of the rolled dough sheet by means of the hand wheel 40 and the screws 41 suitably carried in the frame 10. A transverse chain 42 extends across the machine to the opposite screw 41, as shown in Figures 1 and 7, so that an adjustment of the hand wheel 40 will operate the two screws 41 simultaneously and to the same degree.

*The intermediate conveyor.*—As the rolled dough leaves the rolling pass 33, it travels across a second bridge 43 carried by the frame 10, and thence onto the intermediate conveyor 2 arranged in the form of an endless belt. The belt 2 is driven at times from one source and at other times from another source, as hereinafter described. The front end of the belt 2 travels around the transverse roll 44 which is fast upon the transverse shaft 45 carried in suitable bearings 46 attached to the front frame 10. The rear end of the belt 2 passes around a transverse roll 47 which is fast to the transverse shaft 48 carried in suitable bearings attached to the rear supporting frame 51. The conveyor belt 2 may be tightened by adjusting the belt-tightening roller 52 (see Fig. 6). The upper flight or dough-carrying run of the conveyor 2 is supported by the plate 53 fixed to the rails 54 (see Figs. 6, 10, 15 and 22).

Figure 3:
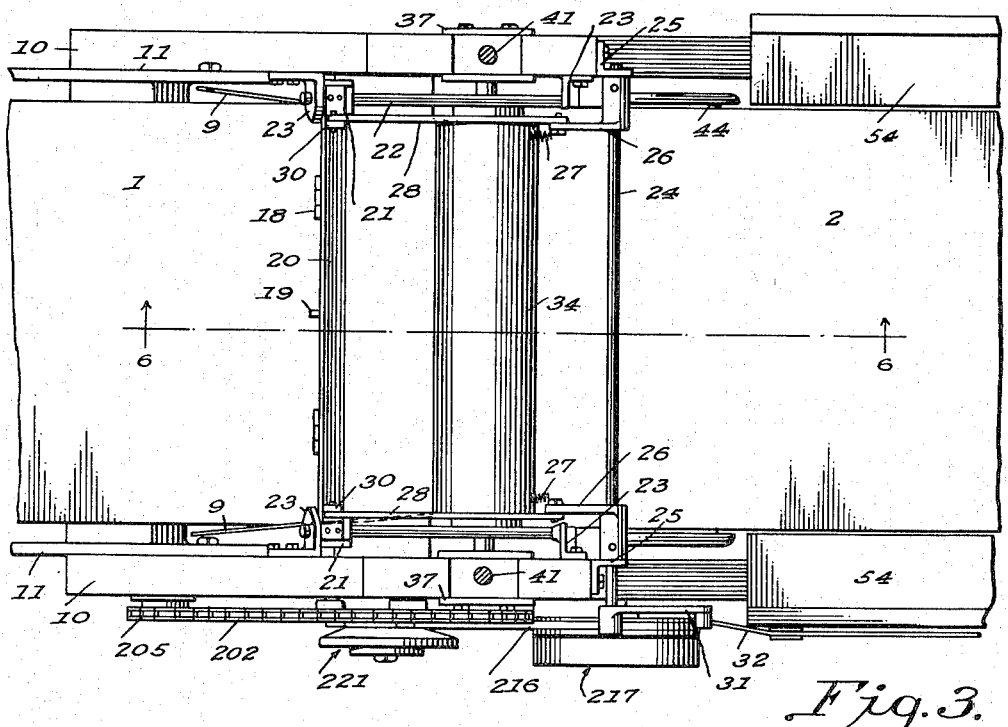
Figure 3 is a plan view of the rear end of the dough-receiving conveyor, the dough rolls, and the front end of the intermediate conveyor and associated driving mechanism.
Figure 4:
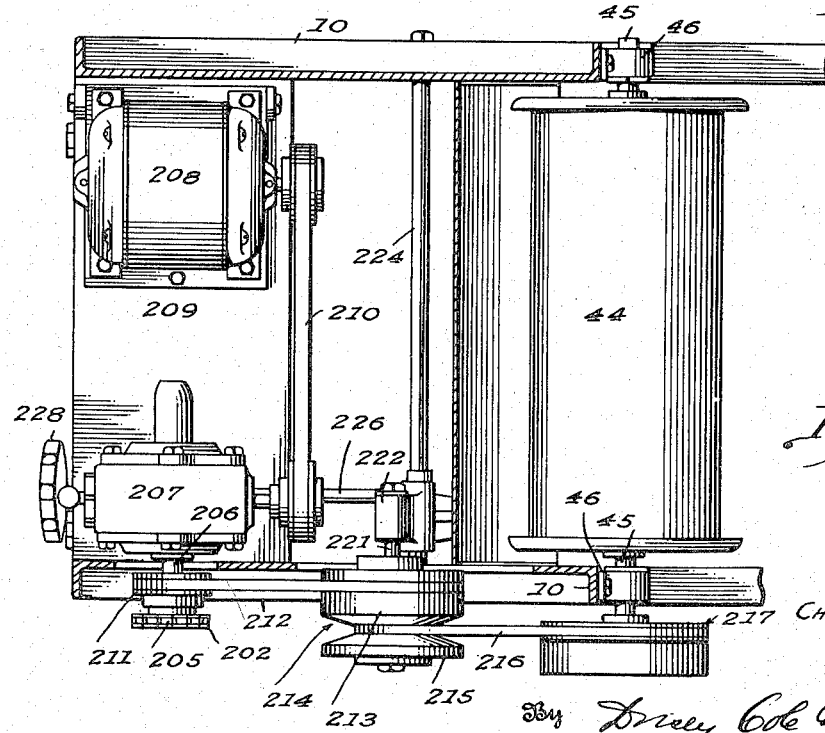
Figure 4 is a plan view illustrating the motor drive for the dough rolls and the front end of the intermediate conveyor.
Figure 5:
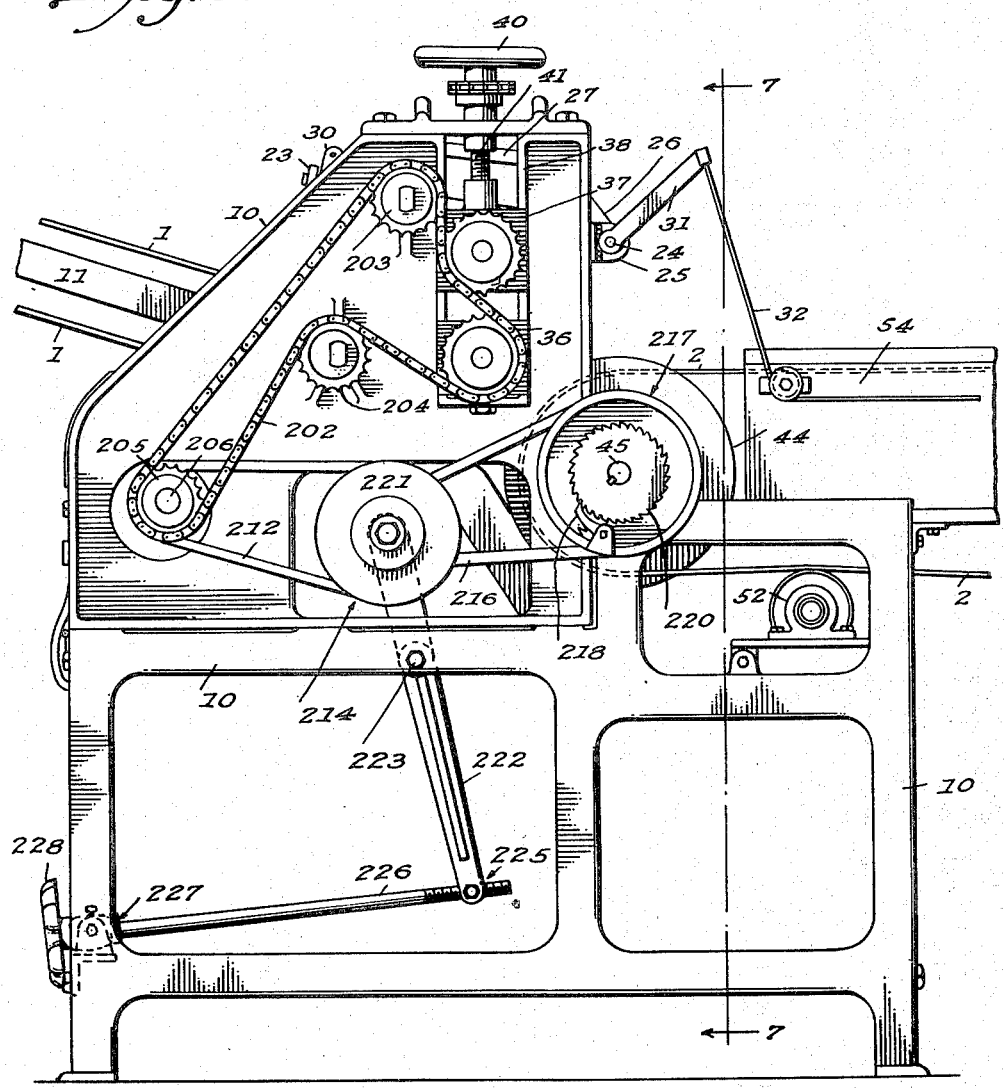
Figure 5 is a side elevation of the driving mechanism for the dough rolls and the front end of the intermediate conveyor.

*The driving mechanism for the dough rolls and part time drive of the intermediate conveyor.*—The dough rolls 34 and 35 are driven by sprocket wheels 200 and 201, respectively, through the sinuous chain 202 which passes over the idlers 203 and 204, the latter of which may be adjustable (see Fig. 5).

The chain also passes over a sprocket wheel 205 keyed to the shaft 206 of a speed-reducing mechanism 207, which in turn is driven by an electric motor 208 through the belt 210. The speed-reducing mechanism 207 and the motor 208 are supported upon the platform 209 on the frame 10. The shaft 206 of the speed-reducer 207 carries a drive pulley 211 for a belt 212, which also passes over the drum 213 of a speed-changing mechanism 214 of well known construction. The speed-changing mechanism includes a grooved or V-pulley 215 which receives one end of a belt 216, the opposite end of the belt passing over the pulley 217 loosely mounted on the shaft 45 of the front conveyor roll 44.

The pulley 217 carries a spring-pressed pawl 218 engageable with the teeth of a ratchet wheel 220 keyed to the shaft 45 of the front conveyor roll 44. The speed-changing device 214 is operable to obtain variable speeds by shifting the driving surfaces of the pulley 215 relatively, thereby increasing or decreasing the effective driving diameter of the pulley. Upon varying this diameter, it is necessary to compensate for any selected changes since the total belt length remains the same, and this is accomplished by mounting the speed-changing device 214 upon the stub shaft 221 carried in the upper end of a lever 222 pivoted intermediate its ends at 223 on the transverse shaft 224. The lower end of the lever 222 carries a screw-threaded shackle 225 which receives the threaded end of a rod 226. The outer end of the rod is supported in a swivelled bearing 227 and has attached thereto the hand wheel 228.

It will be pointed out at this time that the stopping and starting of the motor 208 is controlled by the electric switch 230 when the machine is in service. This switch is supported by a transverse bar 59 attached to the opposite horizontal rails 54. The switch is provided with a downwardly extending shoe 230ª, and this shoe is positioned for operation a short distance ahead of the front edge 55ª of the plate 55, as shown in Figs. 12 and 21. The shoe rests at times upon the surface of the conveyor 2, and during this period the switch 230 is closed, causing the motor 208 to drive the dough rolls 34, 35, and the front roller 44 of the conveyor 2 by the mechanism previously described. As the dough sheet continues its travel upon the conveyor 2 toward the cutting table, its leading edge passes beneath the shoe 230ª, and the shoe rests upon the surface of the dough sheet. The raising of this shoe opens the switch, thus causing the motor 208 to stop, with a consequent stoppage of the dough rolls 34, 35 and the front conveyor roll 44. The further rearward movement of the dough while the shoe remains thereon, is occasioned by the motor 90 and mechanism driven thereby which drives the rear roll 47 of the conveyor 2. This driving mechanism is subject to the engagement and disengagement of the clutch 98 hereinafter described.

When the trailing edge of the dough sheet leaves the shoe 230ª, the latter drops upon the conveyor belt closing the motor circuit, and the motor 208 again starts as before described.

*The transfer of the dough sheet from the intermediate conveyor to the biscuit-cutting table.*—After the front roll 44 ceases driving the conveyor 2, the dough sheet is carried intermittently rearward on the conveyor 2 toward the cutting table by the driving of the rear conveyor roll 47. At a point near the rear end of the conveyor, the dough sheet passes onto the dough-advancing and transfer plate 55 provided with a front bevelled edge 55ª, and downwardly turned rear edge 55ᵇ. The front edge 55ª rests upon, or is in close proximity to the surface of the conveyor 2, and the rear inclined edge 55ᵇ rests upon and travels along the surface of the cutting table 56.

The plate 55 with a portion of the dough sheet thereon, is moved rearwardly and delivers the advancing portion of the dough sheet to the biscuit-cutting table 56 when the biscuit-cutting head 61 is in an elevated position. Following this, and before the cutting head reaches its lowest position, the plate 55 moves forwardly or away from the cutting table and again assumes the position shown in Figure 22, where it receives a new portion of the dough sheet from the conveyor 2 to be advanced to the cutting table 56 for the next succeeding biscuit-cutting operation. The transporting plate 55 has its opposite side provided with ears 241 which carry pins 242. These pins work in slots 243 formed in a vertical leg of U brackets 231, the companion legs of which are fast to the blocks 186 bored to slide on the horizontal guides 187.

Inasmuch as the back and forth movement of the transporting plate 55 is occasioned by the sliding movements of the blocks 186, and these blocks are connected by the links 183 through the pivots 185 and 184 to the levers 172 which move the pan-carrier back and forth in a horizontal direction, the movements of the transporting plate 55 and the pan-carrier 158 will coincide. The mechanism for moving the transfer plate 57 will therefore be described in connection with the mechanism which causes the pan-carrier to move in a horizontal direction.

Adjacent the transfer point of the dough sheet from the conveyor 2 to the plate 55 are guides 240 located on opposite sides of the machine (see Fig. 12), which serve to straighten the edges of the dough sheet and guide the same in its travel toward the cutting table.

Inasmuch as yeast dough has an inherent value of contraction, it is desirable to prevent or minimize this at the time the dough is in contact with the plate 55 and is resting upon the cutting table 56. For this purpose, there is provided the plate 57 pivotally mounted on the transverse pin 58, as shown in Figs. 20 and 22. The pin 58 is carried in the vertical side walls 60 attached to opposite sides of the cutting table 56. The plate 57 projects downwardly at an angle with its lower end in contact with the dough in such a manner that the dough may pass rearwardly and freely beneath the same, but if there is any tendency of the dough sheet to contract or move toward the front end of the machine, it will be arrested. The dough-advancing movement of the plate 55 also aids the removal of the scrap dough left after the cutting operation from the cutting table to the discharge chute 3, the inclination of which is sufficient to permit gravity to exert a pull on the scrap dough and draw it from the machine.

*The cutting table.*—The sheet of dough when ready for cutting is supported by the cutting table 56, as shown in Figure 20, and consists of a plate 83 supported by the frame 51. The plate 83 carries a plurality of circular disks 84 each positioned in axial alignment with each of the cutting knives 67, and held in place by the screws 84ª. Each disk 84 has embedded therein a facing 85 of relatively soft metallic material, so that the point of the docking pins will not be injured when the cutter is operated in such a way that the pins pass through all layers of the dough.

The spaces between the individual cutters are filled with a suitable material 86 in order to provide a flat substantially unbroken surface for the cutting table. This filling material is recessed as at 87, to permit the knives when lowered to slightly enter the table, thus assuring a complete severing of the dough. The filling material surrounding the outer surfaces of the several cutters may be held in place by the retaining strips 88. Vertical plates 60 on opposite sides on the cutting table 56 serve to prevent displacement of the dough on the cutting table.

Wires or rods 89 (see Figs. 21 and 27), extending across and above dough on the cutting table 56, and serve to hold the scrap dough on the cutting table and prevent it from rising with the cutting head after the cutting operation.

*The biscuit-cutting head.*—The biscuit-cutting head is generally designated 61, and is mounted for vertical sliding movement to and from the cutting table 56 on the upright posts 62 supported by the frame 51. The cutting head includes a rectangular frame or casting 63 bored to slide on the posts 62 and the frame 63 carries at its bottom a plurality of movable plates 64 held in place for sliding movement by the retaining strips 65, as shown in Figs. 20 and 22. As shown in Fig. 26, each plate 64 carries twelve or one dozen individual cutters. Obviously, the number of individual cutters employed in the machine can be varied at will.

Inasmuch as the individual cutters are alike, only one will be described. The cutter consists of a top-plate 66 to which is pinned the depending biscuit-cutting circular knife 67 having the sharpened edge 68. Below the top-plate 66 and within the circular knife 67 is a disk 70 in which is embedded a plurality of docking or spit pins 71. These pins are held in the disk 70 by the swaged upper ends of the pins 71 and the covering plate 72. The plate 72 and the disk 70 are held together by the screw 73, and the top-plate 66 and the disk 70 is fastened to the plate 64 by the screws 74.

An ejector 75 is carried for axial and sliding movement within the circular knife 67 by the rod 76 which projects upwardly through the plate 64, as shown in Figs. 22 and 23. The upper end of the rod 76 is provided with a head or enlargement 77. An expansion spring 78 is interposed between the plate 64 and the enlargement 77, and serves to hold the ejector in its upper position, as shown in Figures 21, 23 and 24. A set screw 80 threaded in the disk 70 and having its head within the head 66, serves to limit or adjust the upper position of the ejector and consequently the enlargement 77 at the upper end of the rod 76.

The circular knife or cutter 67 is provided with apertures 81 to permit the escape of air from above and below the ejector. The ejector 75 is provided with a plurality of apertures 82 through which the docking pins 71 extend.

The points of the docking pins are so positioned in respect to the cutting edge 68 of the knife 67 that they pass through the upper layer of dough and enter the lower layer of dough. The number of the docking pins should be such that the aggregate area thereof is sufficient to support the cut biscuit together with the interior wall of the knife by adhesion thereto within the knife 67 following the cutting operation and until the biscuits are ejected into the pan.

*The main drive and the clutch.*—Referring to Figures 10 and 13, the electric motor 90 is the source of power for actuating the cutter head 61 and the panning mechanism later to be described. This motor also drives the mechanism for operating the plate 55 to intermittently advance the dough to the cutting table. The motor 90 also at times undertakes the drive of the belt 2 through the roller 47 to feed the dough onto the plate 55.

The motor 90 is mounted on the platform 91 supported by the frame 51, and is the source of power for revolving the main drive shaft 92. This shaft extends transversely of the machine, and is supported by bearings 93 mounted on opposite sides of the frame 51, see Figs. 10 and 13. The motor 90 drives continuously the pulley 94 of a speed-reducing unit 95, which in turn, through the chain 96 drives a sprocket 97 of the clutch, generally designated 98. Referring to Figs. 28 and 31, it will be observed that the sprocket 97 is fast to the barrel 100, and this barrel rotates continuously about the axis of the shaft 92. A bearing sleeve 101 is interposed between the barrel 100 and shaft 92. Besides the barrel opposite the sprocket 97, is the collar 102, which is fixed to the shaft 92 by the key 103. The collar 102 is formed with a groove 104 to receive the outer end 105ª of a lever 105. A hardened pin 106 is slidably mounted in the collar 102 and extends across the groove 104, as shown in Figs. 28 and 29.

The pin 106 has a normal tendency to move to the right in Figs. 28 and 29, under the influence of the expansion spring 107, embedded in the collar 102. The outer end of the spring bears against a stud 108 fast to the pin 106. The stud 108 lies in a slot 108ª in the collar which prevents the pin 106 from revolving about its axis. When the pin is permitted to move to the right in Figs. 28 and 29 at the proper time, it will enter one of a plurality of recesses 110 (four shown in Fig. 31) in the barrel 100. By using the plurality of recesses in the barrel, the collar 102 and shaft 92 can be quickly locked together, and thus effect a rotation of the driving shaft 92 more rapidly than if a single recess were utilized. The working surfaces of these recesses are reinforced in part by the hardened inserts 111 retained in the barrel 100 by screws 112. The recess 110 is provided with a bevelled surface 113 and a flat surface 114. The pin 106 is provided with a rounded surface 115 and a flat surface 116. It will be observed that when the pin 106 is permitted to move to the right, it will gradually enter the recess 110 by virtue of the surfaces 113 and 115, and the flat shoulder 114 on the barrel will engage the flat surface 116 of the pin 106. Under these circumstances, the constantly driven barrel 100 will produce a continuous and corresponding rotation of the collar 102 and the keyed drive shaft 92 until the pin 106 is moved to the left and withdrawn from the recess 110. When this occurs, the constantly rotating barrel 100 and the collar 102 are disengaged and the shaft 92 ceases to rotate.

In order to move the pin 106 to the left, Figs. 28 and 29, the pin is provided with a transverse slot 117 having a flat surface 117ª, and an adjacent slot 118 arranged at substantially right angles to the slot 117. The outer end 105ª of a lever 105 is normally held in the groove 104 of the collar under the influence of the retractile spring 120 shown in Figure 10. The pin travelling in an anti-clockwise direction as indicated by the arrow in Figs. 30 and 32, brings its slot 118 into contact with the bevelled surface 121 formed on the outer end of the arm 105, and continued travel of the pin causes it to move to the left in Figs. 28 and 29, or toward the observer in Fig. 30. Continued travel of the pin then brings the flat surface 117ª of the transverse slot 117 against the shoulder 122 formed on the outer end of the arm 105. The sequential operations of these parts first serve to retract the pin 106 from the recess 110, and then hold the pin in its retracted position. The collar 102 is thus free from the continuous revolution of the barrel 100.

The end of the arm 105 remote from the clutch 98 is fast to a rock shaft 123 extending transversely of the machine and carried in suitable bearings 124 fast to opposite sides of the frame 51. One end of the rock shaft 123 has fast thereto a foot treadle 125. This treadle is normally held in its upper position by the spring 120 before referred to. The treadle when occupying the position shown in Figure 10, through the action of the spring 120, permits the cutter end 105ª of the arm 105 to occupy a position for withdrawing the pin 106 and thus disengaging the clutch parts. When the treadle is depressed by the machine operator the outer end 105ª of the arm 105 is lowered slightly, so that it will not engage the pin 106, thus permitting the clutch parts to engage and remain so engaged until the treadle 125 is again released or permitted to rise.

*The actuating mechanism for the biscuit-cutting head.*—A cam plate 126 is keyed to the power shaft 92, and its opposite radial faces carry the cam tracks 127 and 128. The cam track 127 is the source of the vertical movements of the biscuit-cutting head and operates the same through the following mechanism. A roller 130, carried by one end of an arm 131, travels in the cam track 127. The opposite end of the arm is loosely mounted on a transverse shaft 132 which is carried in suitable bearings 133 fastened to the frame 51. The arm 131 intermediate its ends, is connected by a link 134 to one end of an arm 135, the other end of which is fast to a transverse rock shaft 136 which lies below the shaft 132. The rock shaft 136 is carried in suitable bearings 137 fastened to the frame 51. Identical arms 138 are fast to the outer ends of the rock shaft 136, and the outer ends of these arms are pivotally connected, as at 140, to the lower ends of vertical lifting rods 141. The upper ends of the lifting rods 141 are pivotally connected, as at 142, to the opposite sides of the biscuit-cutting head 61. Turn buckles 143 permit the length of the lifting rods 141 to be varied and are locked in selected positions by the lock nuts 144. An adjustment of the lifting rods can be used to vary the path of movement of the cutting head.

Referring now to Figure 15, the biscuit-cutting head 61 is shown in its uppermost position. The cam plate 126 carrying the head-raising cam 127, rotates in an anti-clockwise direction and the shape of the cam should be such as to produce the following movements. The roller 130 is about to enter the run 127—A, which permits the head to drop rapidly to cut the biscuits from the dough resting on the cutting table. The roller then enters the run 127—B which lifts the cutting head slightly for a brief period. The roller then enters the run 127—C which permits the head to drop again and the cutters to enter the dough a second time to insure an absolute cutting of the biscuits if any were not cut properly in the first drop of the head and the adhesion of the biscuits to the walls of the cutters and their docking pins. The roller 130 then enters the run 127—D which lifts the cutting head 61 to an elevated position, as shown in Fig. 18. The roller then enters the concentric run 127—E which holds the cutting head elevated and stationary. The roller then enters the run 127—F which raises the cutting head to its highest position, as shown in Fig. 19, for the ejection of the individual biscuits into the receiving pan which has been moved to a position beneath the cutting head by mechanism hereinafter described, and is maintained in this position during the travel of the roller in the concentric cam run 127—G.

During the movement of the head to its highest position as just described, the enlargements 77 of the individual biscuit-ejectors are brought into engagement with a series of transverse bars 146 which serves to depress the individual ejectors 75 and force the cut biscuits from within the cutting knife 67 and off the docking pins 71 into the receiving pans. The bars 146 are maintained in proper position by flanges 147 connected to the top plate 148. This top plate also serves to hold the top of the posts 62 in proper position. The height of the plate 148 and consequently bars 146, can be adjusted by the nuts 150.

As shown in Figure 26, the individual cutters 67 are arranged in three groups or units of one dozen each, and are supported by the plates 64. Just prior to and during the biscuit-cutting operation, the three plates 64 abut one another so that the individual biscuit cutters carried thereby are arranged in a symmetrical pattern conforming with that appearing on the cutting table 56, as shown in Figure 27. This arrangement of the cutters permits the greatest possible amount of dough to be cut from the sheet. However, following the cutting operation, and upon the upward movement of the cutting head 61, it is desirable to separate the groups of cutters mounted on each plate 63, so that each group can deliver or eject its quota of biscuits to the receiving pans which are moved to a position beneath the cutting head to receive the biscuits discharged therefrom. Since the side walls of the pans are flared outwardly the bottoms of the pans are slightly spaced from each other, and it is therefore necessary to separate each group of cutters to meet this contingency. To accomplish this, the central or intermediate plate 64 is fixed to the frame 63. The plates to each side of the central plate are movable to an extent sufficient to separate these plates from the central or intermediate plate.

Figure 11:
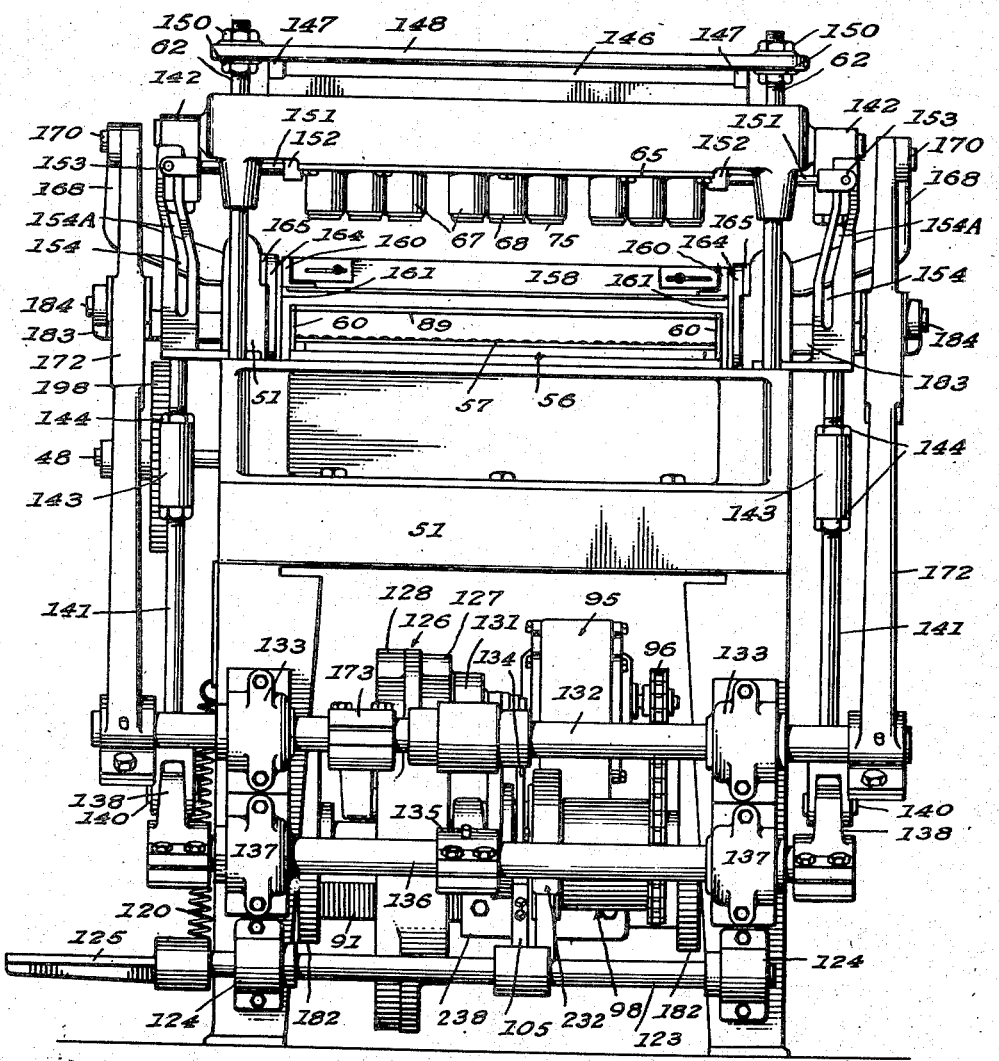
Figure 11 is an end view of the biscuit-cutting and panning mechanism and actuating parts therefor.

To produce this movement, each end plate 64 is attached to rods 151 by clips 152. The opposite ends of the rods carry pins 153 which work in the slots 154 formed in the brackets 155 attached to opposite sides of the frame 51, see Fig. 11. The shape of the slot 154 is such that when the cutting head 61 moves downward to cut the biscuits, the opposite end plates will move toward the central plate and bring all of the individual cutters into a pattern to match that of the cutting table, and occupy this position during the cutting operation. Following the cutting operation, and upon the rise of the cutting head 61, the end plates 63 with their groups of individual cutters, are moved outwardly by the inclination 154—A of the slot 154. The plates carrying the cutters remain in this position until the biscuits have been discharged into the receiving pans, the pans removed, and the cutting head 61 starts down for the next cutting operation.

*The pan-carrier.*—In the embodiment of the invention shown, three pans 156 to accommodate one dozen biscuits each are utilized, and they are arranged side by side in a single row, as shown in the plan view, Fig. 26. The pans are preferably attached to each other by the plates 157, and handled as a unit. The pans are supported by a pan-carrier 158 formed from a series of structural L sections 160 arranged in rectangular form, as shown in Figs. 12 and 26.

Empty pans are loaded into the pan-carrier and pans which have received the cut biscuits and ready for removal from the machine occupy the position shown in Fig. 21. After the biscuits are cut by the head 61 and the head elevated with the biscuits therein, the pan-carrier 158 is moved horizontally to the right in Fig. 21, to a position in vertical alignment with the cutting head, see Fig. 18. The pan-carrier is then moved upwardly to a point where a pan surrounds each group or unit of cutting knives, whereupon the head 61 is slightly raised to cause an ejection of the individual biscuits into the pan, as shown in Figures 19 and 22.

Attached to opposite sides of the pan-carrier 158 are downwardly extending brackets 161 carrying the pins 162. These pins 162 work in vertical slots 163 formed in the brackets 164 attached to the horizontal arms 165. The brackets 164 and arms 165 may be adjusted relatively so as to insure proper operation.

*The mechanism for moving the pan carrier horizontally and for actuating the transfer plate 55.*—The forward or left ends of the arms 165 (Fig. 22), carry blocks 166 bored for sliding movement upon the horizontal guide rods 167. The rods 167 are fixed in the frame 51, as shown in Figures 10 and 16. Links 168 on opposite sides of the machine have one end pivoted to the blocks 166 as at 170, and their opposite ends pivoted at 171 to the upper ends of vertical levers 172. The lower ends of the levers are fast to the transverse shaft 132 previously described. An arm 173 is fast to the shaft 132, and its outer end carries a cam roll 174, which engages the cam track 128 formed in the cam plate 126.

Referring now to Figure 15, where the cutting head is in its highest position, the pan-carrier is in front of the cutting head and the transfer plate 55 is over the rear end of the conveyor 2. The cam roller 174 is just entering the concentric run 128—A which holds the pan-carrier and transfer plate stationary. Thereafter the cam roller then enters the run 128—B which causes the pan-carrier to travel horizontally and rearwardly to a position beneath and in alignment with the cutting head and at the same time move the transfer plate 55 over the cutting table 56. The cam roller 174 then enters the concentric run 128—C which holds the pan-carrier and the transfer plate stationary in these positions. The cam roller then enters the run 128—D which moves the pan-carrier and transfer plate rearwardly where it assumes the position shown in Figure 15.

*The mechanism for moving the pan-carrier vertically.*—The pan-carrier 158, after being positioned in vertical alignment with and beneath the cutting head 61 when the latter is in elevated position, is raised to a point where the lower edges of the cutting knives 67 are within the biscuit pans, thereby insuring an accurate delivery of the biscuits from the cutting head to the pans. Upon receipt of the cut biscuits by the pans, the pan-carrier is returned to its lower position.

The brackets 161 on opposite sides of the machine are engaged from below by the push rods 175 slidable in guideways 176 fast to the frame 51. The lower ends of these rods rest upon feet 177 fast to the upper end of the push rods 178 slidably mounted in the guideways 180. The lower ends of the push rods 178 carry cam rollers 181 which rest upon identical peripheral cams 182 keyed to the shaft 92 (see Figs. 11, 13 and 18).

As shown in Figure 18, the pan-carrier is in its lower position with the cam roller resting on the concentric run 182—A, and about to rise owing to the inclined run 182—B on the cam. Figure 19 shows the pan-carrier in its upper position with the cam rollers 181 at the top of the run 182—B. Further revolution of the cams 182 in an anti-clockwise direction permits the cam rollers 181 to lower by virtue of the inclined run 182—C, and rest upon the concentric run 182—A.

*The drive for the rear conveyor roll 47.*—As previously explained, the intermediate conveyor belt 2 is driven at times by the motor 208, and at other times by a motor 90. It has also been explained that levers 172 on opposite sides of the machine, operate under the influence of the cam track 128. One of the links 183, see Figs. 10 and 18 connected with the lever 172 and block 186 carries an ear 188 to which is pivoted at 190 one end of a downwardly extending link 191. The opposite end of the link is pivoted as at 192 to one end of an arm 193. The opposite end of this arm is free to rotate upon the shaft 48. The arm 193 is provided with an ear 194 to which is pivoted as at 195, a pawl 196 under the influence of a retractile spring 197. As will appear from Figures 10 and 18, this pawl engages the ratchet wheel 198 which is fast to the drive shaft 48 of the rear conveyor roll 47.

From the foregoing, it will appear that the rearward movement of the belt 2, the movements of the transfer plate 55, and the horizontal movements of the pan-carrier are derived from the lever 172 which in turn is controlled by the cam 128. However, when the lever 172 moves the transfer plate and carrier away from the cutting table the rear conveyor roll does not revolve since the pawl 196 rides the teeth of the ratchet wheel 198 connected to the roll.

*The braking mechanism.*—To dampen any undue vibration in the machine, especially at the time the pan-carrier starts its downward movement following the delivery of the cut biscuits to the pans, and the forward horizontal movement of the pan-carrier to unloading and loading position, a braking mechanism may be employed. This mechanism consists of an element 232, formed with a bevelled entering surface 233. The element is clamped fast as at 234, to the clutch collar 102, and rotates therewith. At the times above indicated, the element 232 revolving anti-clockwise, enters the opening 236 between oppositely disposed spring-pressed brake shoes 237 carried by brackets 238 affixed to the platform 91. Figure 19 shows the element entering the brake shoes 237, and Figure 14 shows the element after it has left the shoe.

*The next succeeding dough sheet.*—The dough-worker or attendant places a second or succeeding sheet of dough on the dough-receiving conveyor 1 after the preceding or first sheet of dough has passed through the dough rolls, and moves the second sheet to a position under the plate 17, where it can be moved toward the rolls when the machine operator again pulls the hand lever 6 to advance it to the cutting rolls. The machine operator watches the advance of the first dough sheet on the conveyor 2 and brings the second sheet of dough onto the conveyor 2 at a time when it will closely follow the first sheet of dough, thus providing for a continuous operation of the machine.

*Operation.*—The several steps and the operation of the machine will be described in connection with the manufacture of butter biscuits, i. e., biscuits composed of two or more layers of yeast dough, there being interposed between each layer a film of butter or oleaginous material. A skilled dough worker or attendant breaks or rolls a mass of dough into sheet form after which the sheet is spread upon a work table and one-half of the upper surface of the sheet is coated with a film of butter or other oleaginous material. The dry portion of the sheet is then folded over the buttered half of the sheet and the dough sheet thus constituted is delivered to a receiving conveyor 1. The attendant manually moves the conveyor toward the dough-working or rolling mechanism, so that the entering edge of the dough sheet passes under and slightly beyond the plate 17 (see Figs. 6 and 8), onto the bridge 16 (see Figs. 6 and 8).

It will be understood that the motor 208 is now running and driving the dough rolls 34, 35 and intermediate conveyor 2 through the front conveyor roll 44 and the motor 90 is running at all times. The machine operator who occupies a position adjacent the hand lever 6 and foot treadle 125 (see Fig. 2) pulls the hand lever 6 rearwardly or toward the right, which causes the plate 17 now engaging the dough sheet, to move it rearwardly into the rolling pass 33 between the dough rolls 34 and 35, the former being adjustable (see Fig. 6). The plate 17 will prevent the dough from moving forwardly or toward the dough-loading point.

The dough being thus rolled to a predetermined thickness is impelled to move down the bridge 43 and onto the top flight or run of the conveyor 2. The lineal speed of the dough rolls and the belt of the conveyor 2 is variable, and by preference, the relative speeds should be such as not to stretch unduly the dough sheet.

The intermediate conveyor 2 carries the dough sheet rearwardly toward the cutting table to a point where the leading edge of the dough sheet passes under the shoe 230ª of the electric switch 230 and the shoe then rests on the dough sheet. The raising of the shoe, opens the switch and stops the motor 208 which in turn stops the rotation of the dough rolls 34, 35 and conveyor 2. The machine operator then depresses the foot treadle 125, and the machine will pass through one or two empty or nonproducing cycles, except that a rear section of the dough sheet is transferred from the conveyor onto the transfer plate 55 and then to the cutting table.

Assuming the several mechanisms to be in the position shown in Figure 15, and the elements of the clutch 98 in engagement and thus rotating the main drive shaft 92 in an anti-clockwise direction, as indicated in several of the figures, the cam roller 174 passes through the concentric 128–A of the cam 128, holding the conveyor 2, transfer plate 55 and pan-carrier 158, stationary.

At this time the cutting head cam roller 130 enters the cam run 127—A permitting the cutting head 61 to lower rapidly to cut the biscuits from the dough sheet on the cutting table. As the cutting head is lowering, the pins 153 carried on opposite sides of the cutting head 61 enter the inclined slots 154—A, causing the separated plates 63 to move toward one another, thus bringing the cutting groups or units together and into the pattern of the cutting table. The cam roller 130 then enters the run 127—B slightly elevating the cutting head momentarily, and the roller 130 then enters the run 127—C, which causes the cutting head to lower again for a second cut. This second cut is for the purpose of cutting any residue which for some reason may have been left uncut in the first cutting operation. This second cutting also insures a clean cutting of the individual biscuits if any were insufficiently cut in the first cutting movement. It also insures the adhesion of the cut biscuit to the surface of the docking pins and the interior wall of the cutter. Inasmuch as flour is cast upon the dough sheet from time to time as occasion requires, when the cutters lower for the first cut the inner surfaces of the cutting knives and the surfaces of the docking pins may carry some of this flour along with them in penetrating the dough. If there is an excess of flour, there is a tendency for the cut biscuit not to adhere to the walls of the knives 67 or the docking pins. This flour if excessive, may be lifted by the cutters and docking pins on the slight rise, or incorporated in the dough in the region of penetration, but on the second cut, sufficient surface area is present substantially free from flour to establish the required adhesion. The cam roller 130 then enters the run 127—D which raises the head to its first elevated position, and it is maintained in that position by the concentric run 127—E. While the head 61 is raising, the pins 153 carried by opposite sides of the cutting head enter the inclined slots 154—A, causing a separation of the cutter-supporting plates 63, and a consequent separation of the cutting units or groups.

About the time the cutting head reaches the elevated position just described, the cam roller 174 enters the cam run 182—B. The cam roller 174 then enters the run 128—B, causing the conveyor 2 with the dough sheet thereon to start moving rearwardly toward the cutting table 56, the conveyor being actuated at this time by the lever 172, link 183, link 191, arm 192, pawl 196, and ratchet wheel 198, the latter being fast to the rear conveyor roll 47. At the same time the transfer plate 55 being connected to part of this mechanism, as before described, moves rearwardly with a portion of the dough sheet thereon, toward the cutting table from the position shown in Figure 20 to that shown in Figure 22, where it positions the dough over the cutting table. Simultaneous with the above movements of the conveyor 2 and transfer plate 55, the pan-carrier moves rearwardly toward the cutting table from the position shown in Fig. 20 to the position shown in Fig. 22. The cam roller 174 then enters the concentric run 128—C, holding the transfer plate and pan-carrier over the cutting table.

The pan-carrier while in this position is raised to a position beneath the cutting head where the pan surrounds the several units of the cutting head, and this is occasioned by the cam rollers 181 travelling on the incline run 182—B of the lifting cams 182. It will be recalled that there are two identical cams 182 located on opposite sides of the machine. When the pan-carrier reaches its highest position, the cutting head is being moved to its highest position by the cam run 127—F, and during this movement the enlargements 77 on the ejector rods 76 are brought in contact with the transverse bars 146 located above the head 61, and the continued upward movement of the head causes an ejection of the individual biscuits into their respective receiving pans. The cam run 127—G maintains the cutting head at its highest position throughout the run to the position shown in Figure 15 and meanwhile the cam run 128—D causes the pan-carrier 153 and transfer plate 55 to move forwardly and assume the position indicated in Figure 15, thus completing a cycle. At this point, the pans with the cut biscuits therein, are removed from the pan-carrier and a set of empty pans placed therein.

Master switches 245 and 246 (Figs. 2 and 10) control the power lines to the motors 208 and 90, respectively, and are placed within reach of the machine operator.

What is claimed is:

1. In a dough-working, conveying and cutting machine, the combination of a dough-rolling mechanism, means for feeding a sheet of dough to the rolling mechanism, a stationary cutting bed or table, a conveyor intermediate the rolling mechanism and cutting table, means for transferring the sheet of dough from the conveyor to the surface of the cutting table, a cutting head, and means for raising and lowering the head with respect to the cutting table.

2. In a dough-working, conveying and cutting machine, the combination of a dough-rolling mechanism, means for feeding a sheet of dough to the rolling mechanism, a stationary cutting bed or table, a flat conveyor intermediate the rolling mechanism and cutting table, means for rotating the rolls and moving the conveyor in synchronism, means for transferring the sheet of dough from the conveyor to the surface of the cutting table, a cutting head, and means for raising and lowering the head in respect to the cutting table.

3. In a dough-working, conveying and cutting machine, the combination of a dough-rolling mechanism, means for feeding a sheet of dough to the rolling mechanism, a stationary cutting table, a flat conveyor intermediate the rolling mechanism and cutting table, means for driving the rolling mechanism and the conveyor at substantially the same lineal speed, means for transferring the sheet of dough from the conveyor to the surface of the cutting table, a cutting head, and means for raising and lowering the head in respect to the cutting table.

4. In a dough-working, conveying and cutting machine, the combination of a dough-rolling mechanism, means for feeding a sheet of dough to the rolling mechanism, a stationary cutting table, a flat conveyor intermediate the rolling mechanism and cutting table, means for driving the rolling mechanism and the conveyor at different lineal speeds, means for transferring the sheet of dough from the conveyor to the surface of the cutting table, a cutting head, and means for raising and lowering the head in respect to the cutting table.

5. In a dough-working, conveying and cutting machine, the combination of a dough-rolling mechanism, means for feeding a sheet of dough to the rolling mechanism, a stationary cutting table, a flat conveyor intermediate the rolling mechanism and cutting table, a common drive for the rolling mechanism and conveyor, means for transferring the sheet of dough from the conveyor to the surface of the cutting table, a cutting head, and means for raising and lowering the head in respect to the cutting table.

6. In a dough-working, conveying and cutting machine, the combination of a dough-rolling mechanism, means for feeding a sheet of dough to the rolling mechanism, a stationary cutting table, a flat conveyor intermediate the rolling mechanism and cutting table, means for transferring the sheet of dough from the conveyor to the surface of the cutting table, a cutting head, means for raising and lowering the head in respect to the cutting table, and means for operating the conveyor and cutting head in synchronism.

7. In a dough-working, conveying and cutting machine, the combination of a dough-rolling mechanism, means for feeding a sheet of dough to the rolling mechanism, a stationary cutting table, a conveyor intermediate the rolling mechanism and cutting table, a movable transfer plate operable to transfer a sheet of dough from the conveyor to the surface of the cutting table, a cutting head movable toward and away from the cutting table, and means for moving the conveyor, transfer plate and cutting head in synchronism.

8. In a dough-working, conveying and cutting machine, the combination of a dough-rolling mechanism, means for feeding a sheet of dough to the rolling mechanism, a stationary cutting table, a conveyor intermediate the rolling mechanism and cutting table, a movable transfer table operable to transfer a sheet of dough from the conveyor to the surface of the cutting table, a cutting head movable toward and away from the cutting table, and a common drive shaft for moving the conveyor, transfer table and cutting head in synchronism.

9. In a dough-working, conveying and cutting machine, the combination of a dough-rolling mechanism, means for feeding a sheet of dough to the rolling mechanism, a cutting table, a conveyor intermediate the rolling mechanism and cutting table, means for transferring the sheet of dough from the conveyor to the surface of the cutting table, means for raising and lowering the head in respect to the cutting table, and means for moving the conveyor at times from one source of power and at other times from another and independent source of power.

10. In a dough-working, conveying and cutting machine, the combination of a dough-rolling mechanism, means for feeding a sheet of dough to the rolling mechanism, a cutting table, a conveyor intermediate the rolling mechanism and cutting table, means for transferring the sheet of dough from the conveyor to the surface of the cutting table, means for raising and lowering the head in respect to the cutting table, means for actuating the dough-rolling mechanism and at times the conveyor, and separate and independent means for raising and lowering the cutting head and at other times moving the conveyor.

11. The combination of a surface or table for supporting a sheet of dough to be cut into individual blanks, a cutter head, means operating automatically and in a predetermined order and time for moving said head to said surface or table to cut an individual blank, for slightly reversing the direction of movement of the head and immediately moving the head again to the cutting surface or table for a second cutting operation.

12. In a machine of the character described, the combination with a cutting head carrying a plurality of individual biscuit-cutters provided with cutting edges and docking pins within each of said cutters, a cutting table provided with a bed plate, a plurality of disks affixed to said plate, each disk having an edge to cooperate with the cutting edge of each cutter and having embedded therein a facing of relatively soft metallic material, a filling material surrounding each of said disks and provided with an annular recess surrounding each disk to accord the reception of the cutting edge of a biscuit-cutter, said soft metallic material being located in a projected path of the docking pins of each cutter.

13. In a machine of the character described, the combination of a dough rolling mechanism, means for feeding a sheet of dough to the rolling mechanism, a stationary cutting bed or table, a conveyor intermediate the rolling mechanism and cutting table, reciprocating means between the conveyor and cutting table for transferring the sheet of dough from the conveyor to the surface of the cutting table, a cutting head, and means for raising and lowering the head in respect to the cutting table.

14. In a machine of the character described, the combination of a dough rolling mechanism, means for feeding the sheet of dough to the rolling mechanism, a stationary cutting bed or table, a conveyor intermediate the rolling mechanism and cutting table, reciprocating means located between the conveyor and cutting table for transferring the sheet of dough from the conveyor to the surface of the cutting table, a cutting head, means for moving the cutting head into and out of contact with the cutting table, and means for moving the reciprocating means in timed relation to the movements of the cutting head.

15. In a machine of the character described, the combination of a dough rolling mechanism, means for feeding a sheet of dough to the rolling mechanism, a stationary cutting bed or table, a conveyor intermediate the rolling mechanism and cutting table, reciprocating means located between the conveyor and cutting table for transferring the sheet of dough from the conveyor to the surface of the cutting table, a cutting head, means for moving the cutting head into and out of contact with the cutting table, and means for moving the reciprocating means to a position over the cutting table when the cutting head is out of contact therewith.

16. In a machine of the character described, the combination of a dough rolling mechanism, means for feeding a sheet of dough to the rolling mechanism, a stationary cutting head or table, a conveyor intermediate the roller mechanism and cutting table, means for transferring the sheet of dough from the conveyor to the surface of the cutting table, a movable cutting head for cutting biscuits from the dough sheet when on the table, and means for varying the path of movement of the cutting head.

17. In a device of the character described, the combination of a cutting table, a cutting head, means for raising and lowering the head in a predetermined order and time in respect to the cutting table, a pan-carrier adapted to carry and support a baking pan, means for moving the carrier with the pan thereon horizontally to a position between the cutting head when raised and the cutting table, and means for raising the carrier toward the cutting head when the latter is away from the cutting table.

18. In a device of the character described, the combination of a cutting table, a cutting head carrying a plurality of biscuit cutting units, each embodying a series of individual biscuit cutters, means for raising and lowering the cutting head in respect to the cutting table, a pan-carrier adapted to carry and support a plurality of baking pans, means for moving said pan carrier horizontally to a position between the cutting head when raised and the cutting table, means for separating the biscuit cutting units carried by the cutting head, means for raising said carrier and the pans carried thereby toward the cutting head and to a position where the pans carried by the carrier surround the biscuit cutting units, and means for ejecting the cut biscuits from the individual biscuit cutters into the pans.

19. In a device of the character described, the combination of a cutting table, a cutting head carrying a plurality of biscuit cutting units, each embodying a series of individual biscuit cutters, means for raising and lowering the cutting head in respect to the cutting table, a pan-carrier adapted to carry and support a plurality of baking pans, means for moving said carrier horizontally to a position between the cutting head when raised and the cutting table, means for separating the biscuit cutting units carried by the cutting head, means for raising said carrier and the pans carried thereby toward the cutting head and to a position where the pans carried by the frame surround the biscuit cutting units, means for ejecting the cut biscuits from the individual biscuit cutters into the pans, and means for restoring the separated biscuit cutting units to their original position.

20. In a device of the character described, the combination of a cutting table, a cutting head carrying a plurality of biscuit cutting units each embodying a series of individual biscuit cutters, means for raising and lowering the cutting head in respect to the cutting table, a pan-carrier adapted to carry and support a plurality of baking pans, means for moving said carrier horizontally to and from a position between the cutting head when raised and the cutting table, means for separating the biscuit cutting units carried by the cutting head, means for raising said carrier and pans carried thereby toward the cutting head and to a position where the pans carried by the carrier surround the biscuit cutting units and thereafter lowering the same, and means for ejecting the cut biscuits from the individual biscuit cutters into the pans when said pans occupy their raised positions.

21. In a device of the character described, the combination of a cutting table, a movable cutting head, a pan-carrier adapted to carry and support a baking pan movable horizontally toward and away from said cutting head and vertically in respect thereto, and means for automatically actuating said head and pan-carrier in a predetermined order and time.

22. In a device of the character described, the combination of a cutting table, a movable cutting head, a pan-carrier adapted to carry and support a baking pan movable horizontally toward and away from said cutting head and vertically in respect thereto, and a common drive shaft for moving the cutting head and pan-carrier in a predetermined order and time.

23. In a device of the character described, the combination of a cutting table, a cutting head, means for moving the cutting head toward and away from the cutting table, movable means for delivering a sheet of dough onto the surface of the cutting table, a movable pan-carrier adapted to support a baking pan, and means for simultaneously moving said movable means and pan-carrier to a position above the cutting table when the cutting head is away therefrom.

24. In a device of the character described, the combination of a cutting table, means for conveying a sheet of dough to the cutting table and means for driving the same, a movable cutting head for cutting biscuits from the dough sheet on the table, means operable at a predetermined point by the dough on the conveying means for arresting said driving mechanism, and means for inaugurating at will a driving mechanism for the conveyor and cutting head.

25. In a device of the character described, the combination of a cutting table, means in advance of the cutting table for conveying a sheet of dough toward the cutting table and means for driving the same, a movable transfer plate intermediate said conveying means and cutting table for transferring a sheet of dough from the conveying means onto the surface of the cutting table, a movable cutting head for cutting biscuits from the dough sheet on the table, means operable at a predetermined point by the dough on the conveyor for arresting said driving mechanism, and means for inaugurating at will a synchronized mechanism for the conveyor, transfer plate and cutting head.

26. A biscuit cutter or the like comprising a head and means for moving the same, a plurality of biscuit cutting units arranged in proximity to each other during the cutting movement of the head each unit embodying a series of individual biscuit cutters and means for moving said units relatively so as to separate them each from the other.

27. In a machine of the character described, the combination of a cutting table, means for conveying the dough sheet to the cutting table and for driving the same, a cutting head movable toward and away from the cutting table, means operable at a predetermined point by the travel of the dough when on the conveyor for arresting said driving mechanism, and means for inaugurating at will a synchronized driving mechanism for actuating the conveyor and cutting head.

28. In a device of the character described, the combination of a cutting table arranged to receive and support a dough sheet, a cutting head having means to cut a plurality of biscuits from the dough sheet resting on the cutting table, retain said biscuits therein and thereafter deliver said cut biscuits to a baking pan, means for raising and lowering the head in a predetermined order and time in respect to the cutting table, a pan-carrier adapted to carry and support a baking pan, and means for moving the carrier with the pan thereon horizontally to a position beneath the cutting head when the latter is raised from the cutting table to receive the cut biscuits from the cutting head.

29. The combination with a surface or table for supporting a sheet of dough to be cut into blanks for making biscuits, of a cutter head including a series of hollow cutters having cutting edges opposed to the supporting surface, means operating automatically and in predetermined order and time for moving said head to said surface to cause said cutters to cut out the biscuit blanks by pressure of said cutters against said surface, and for slightly reversing the direction of movement of the head and immediately moving the head again to the supporting surface to perform a second cutting operation.

CHARLES GAINER TURNER.

REFERENCES CITED

The following references are of record in the file of this patent:

UNITED STATES PATENTS

| Number | Name | Date |
| --- | --- | --- |
| 19,968 | Schuyler | Apr. 13, 1858 |
| 279,913 | Chase | June 26, 1883 |
| 281,464 | Cornell et al. | July 17, 1883 |
| 585,789 | Rosback | July 6, 1897 |
| 660,461 | Rosback | Oct. 23, 1900 |
| 761,842 | Laukhuff | June 7, 1904 |
| 787,081 | Copland | Apr. 11, 1905 |
| 972,985 | Bates | Oct. 18, 1910 |
| 998,017 | Laukhuff | July 18, 1911 |
| 1,317,742 | Van Houten | Oct. 7, 1919 |
| 1,353,077 | Smith | Sept. 14, 1920 |
| 1,831,826 | Sergent | Nov. 17, 1931 |
| 1,834,012 | Willoughby | Dec. 1, 1931 |
| 1,975,326 | Loose et al. | Oct. 2, 1934 |
| 2,089,396 | Meilstrup | Oct. 10, 1937 |
| 2,279,420 | Thum | Apr. 14, 1942 |
| 2,283,298 | Thum | May 19, 1942 |